US009461556B2

(12) United States Patent
Flett

(10) Patent No.: US 9,461,556 B2
(45) Date of Patent: Oct. 4, 2016

(54) STABLE REGENERATIVE BI-DIRECTIONAL CELL FOR BRIDGE POWER INVERTERS

(71) Applicant: Rhombus Energy Solutions, Inc., San Diego, CA (US)

(72) Inventor: Frederick Flett, Indio, CA (US)

(73) Assignee: RHOMBUS ENERGY SOLUTIONS, INC., San Diego, CA (US)

( * ) Notice: Subject to any disclaimer, the term of this patent is extended or adjusted under 35 U.S.C. 154(b) by 341 days.

(21) Appl. No.: 14/063,771

(22) Filed: Oct. 25, 2013

(65) Prior Publication Data
US 2015/0117073 A1 Apr. 30, 2015

(51) Int. Cl.
H02M 5/458 (2006.01)
H02J 3/32 (2006.01)
H02J 7/34 (2006.01)

(52) U.S. Cl.
CPC .............. *H02M 5/4585* (2013.01); *H02J 3/32* (2013.01); *H02J 7/34* (2013.01)

(58) Field of Classification Search
CPC ...... H02M 5/40; H02M 5/45; H02M 5/4505; H02M 5/453; H02M 5/458; H02M 5/4585; H02M 5/42; H02M 7/66; H02M 7/797; H02J 3/32; H02J 7/34; H02J 3/34
See application file for complete search history.

(56) References Cited

U.S. PATENT DOCUMENTS

| | | | | |
|---|---|---|---|---|
| 5,574,636 A * | 11/1996 | Lee | ..................... | H02M 5/4585 363/132 |
| 8,212,506 B2 * | 7/2012 | Iwahori | ................... | B60L 11/08 318/139 |
| 2013/0002186 A1 * | 1/2013 | Iwahori | ................. | B60L 11/123 318/722 |
| 2015/0236618 A1 * | 8/2015 | Perdikakis | ............... | H02P 6/14 318/400.27 |

OTHER PUBLICATIONS

Hartmann, M., et al., "A Three-Phase Delta Switch Rectifier for More Electric Aircraft Applications Employing a Novel PWM Current Control Concept", Proceedings of the Twenty-Fourth Annual IEEE Applied Power Electronics Conference (APEC) and Exposition, Washington, D.C., (Feb. 15-19, 2009), 1633-1640.

\* cited by examiner

*Primary Examiner* — Timothy J Dole
*Assistant Examiner* — Shahzeb K Ahmad
(74) *Attorney, Agent, or Firm* — Jonathan A. Kidney; TechLaw LLP

(57) ABSTRACT

A high efficiency, multi-mode, regenerative AC-DC-AC inverter power system contains an inverter bridge, a bi-phase matrix (BP-Mtx) containing reverse current oriented, series-connected sets of controllable switches, wherein inputs to a first and second set of controllable switches are coupled to the inputs of the first inverter bridge, and outputs of the first and second set of controllable switches are coupled to inputs to a third set of controllable switches. A chargeable DC power supply is coupled to an output of the third set of controllable switches. The load-side DC-bus is coupled to outputs of the first inverter bridge and a second inverter bridge. The switches of the first inverter bridge, second inverter bridge, and BP-Mtx are modulated to charge the DC power supply from either excess voltage from line inputs or the DC-bus, and to provide compensating energy from the DC power supply for load or line input perturbations.

17 Claims, 17 Drawing Sheets

STABLE REGENERATIVE BI-DIRECTIONAL CELL FOR BRIDGE POWER INVERTERS

BACKGROUND

1. Field

This invention relates to efficient recovery of energy in an AC-to-AC power inverter system. More particularly, it relates to an efficient bi-directional circuit configuration with load stability for a power source inverter system.

2. Background

It is common, for more sophisticated power systems that use three (3) phase AC line inputs, to implement a set of six (6) input switching bidirectional inverters that flatten the input AC to a DC value. The DC is supplied to a bus that is coupled to six (6) output switching inverters which then convert the DC back to AC. This AC-to-DC and from DC-to-AC path provides needed output voltage stability and input isolation, particularly when the input source is a "fluctuating" AC grid or if the load requires very stable power.

More advanced systems allow for power to be transferred back into the input AC grid when the DC-bus voltage exceeds the normal input line voltage, via the input bidirectional inverters. Due to all the switching and circuit losses, the normal efficiency of these systems is around the low 90%. In addition to these losses, these systems require a very large DC-link capacitance bank to compensate for step-wise load variations (e.g., switching on an electric motor) that would otherwise cause unacceptable voltage/current fluctuations.

In view of the above, there has been a long-stand need in the industry for inverter systems that have higher efficiencies and are less sensitive to step loads. Solutions to these and other shortcomings in the power inverter industry are elucidated in the following description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a multi-mode, regenerative AC-DC-AC inverter power system is provided, comprising: a first inverter bridge with controllable switches configurable for coupling to line inputs from a 3-phase AC power source; a bi-phase matrix (BP-Mtx) containing reverse current oriented, series-connected sets of controllable BP-Mtx switches, wherein inputs to a first and second set of controllable BP-Mtx switches are coupled to the inputs of the first inverter bridge, and outputs of the first and second set of controllable BP-Mtx switches are coupled to inputs to a third set of controllable BP switches; a chargeable DC power supply coupled to an output of the third set of controllable BP-Mtx switches; a DC-bus coupled to outputs of the first inverter bridge; and a second inverter bridge with controllable switches, inputs thereof coupled to an opposite end of the DC-bus from the first inverter bridge, and outputs thereof configurable for coupling to a load, wherein switches of at least the first inverter bridge, second inverter bridge, and BP-Mtx are controllable to charge the DC power supply from at least one of excess voltage from the line inputs and DC-bus, and to provide compensating energy from the DC power supply for load or line input perturbations.

In other aspects of the above embodiment, the DC bus is shunted by at least a DC voltage stabilizing capacitor; and/or the DC power supply comprises at least one of a battery, an ultracapacitor, and disconnect switch; and/or further comprises a switch controller, controlling switches of at least the first inverter bridge, second inverter bridge, and BP-Mtx; and/or the switch controller utilizes a State Vector Method (SVM) for switch modulation; and/or switches of at least the first inverter bridge, second inverter bridge, and BP-Mtx are at least one of diode bridged, field-effect transistors (FETs), power metal-oxide-semiconductor-effect transistors (MOSFETs), and insulated-gate-bipolar Transistors (IGBT); and/or the first inverter bridge and second inverter bridge are of a similar arrangement of six diode-bridged transistors in forward current oriented pairs connected in parallel, and the BP-Mtx switches are six diode-bridged transistors in an arrangement of non-parallel-connected upper switch pair, lower switch pair, and middle switch pair, wherein a first input of the middle switch pair is coupled to an output of the upper switch pair and a second input of the middle switch pair is coupled to an output of the lower switch pair; and/or further comprises line inputs from a 3-phase AC power source coupled to the first inverter bridge; and a load coupled to the second inverter bridge; and/or a DC boost circuit is coupled to the DC power supply.

In another aspect of the disclosed embodiments, a multi-mode, regenerative AC-DC-AC inverter power system is provided, comprising: a rectifying bridge configurable for coupling to line inputs from a first 3-phase AC power source; a bi-phase matrix (BP-Mtx) comprising, reverse current oriented, series-connected sets of controllable BP-Mtx switches, wherein inputs to a first and second set of controllable BP-Mtx switches are coupled to inputs of the rectifying bridge, and outputs of the first and second set of controllable BP-Mtx switches are coupled to inputs to a third set of controllable BP-Mtx switches; a chargeable DC power supply coupled to an output of the third set of controllable BP-Mtx switches; a bridge connection coupled to outputs of the rectifying bridge and to a DC-bus configurable for coupling to a load; and an inverter bridge with controllable switches, configurable for coupling to line inputs from a second 3-phase AC power source, wherein an output of the inverter bridge is coupled to at least one of the bridge connection and the DC-bus, wherein switches of at least the BP-Mtx and inverter bridge are controllable to charge the DC power supply from at least one of excess voltage from the line inputs and DC-bus, and to provide compensating energy from the DC power supply for load or line input perturbations.

In other aspects of the above embodiment, the DC-bus is shunted by at least a DC voltage stabilizing capacitor; and/or the DC power supply comprises at least one of a battery, an ultracapacitor, and disconnect switch; and/or a switch controller controls switches of at least the BP-Mtx and inverter bridge; and/or the switch controller utilizes a State Vector Method (SVM) for switch modulation; and/or a DC boost circuit coupled to the DC power supply; and/or switches of at least the BP-Mtx and inverter bridge are at least one of diode bridged, field-effect transistors (FETs), power metal-oxide-semiconductor-effect transistors (MOSFETs), and insulated-gate-bipolar Transistors (IGBT); and/or the BP-Mtx switches are six diode-bridged transistors in an arrangement of non-parallel-connected upper switch pair, lower switch pair, and middle switch pair, wherein a first input of the middle switch pair is coupled to an output of the upper switch pair and a second input of the middle switch pair is coupled to an output of the lower switch pair.

In another aspect of the disclosed embodiments, a method of operating a multi-mode, regenerative AC-DC-AC inverter power system is provided, comprising: a computerized system controller detecting a bus instability event in a multi-mode, regenerative AC-DC-AC inverter power system, and upon detection; automatically determining if a dc power source coupled to the system is available for power regeneration and if so, automatically activating a regeneration mode and applying voltage from the dc power source to the system; wherein if the dc power source is not available for power regeneration, automatically determining if the dc power source has a low voltage and if so, automatically charging the dc power source from available power, wherein if the dc power source does not have low voltage, automatically determining if the dc power source is charging and if so, automatically charging the dc power source from available power, wherein if the dc power source is not charging to automatically activate the regeneration mode and apply voltage from the dc power source to the system.

In other aspects of the above embodiment, wherein after completion of at least one of the steps of applying voltage from the dc power source to the system and charging the dc power source from available power, automatically returning to detecting a bus instability event; and/or wherein, upon activating a regeneration mode, determining, by the controller, if a voltage of a dc bus of the system has a voltage greater than a voltage of an AC grid input and if so, proceeding to the step of automatically determining if the dc power source is charging, wherein if the voltage of the dc bus is less than the voltage of the AC grid input, returning to a regeneration mode monitoring mode.

DETAILED DESCRIPTION

Various embodiments described below allow for an AC-to-DC-to-AC power inverter architecture to operate with higher efficiency and also recharge/supply a supplemental DC source. Various embodiments also provide superior step load stability and configurability for multiple source/load scenarios, as well as other capabilities as described in the following figures.

Figure 1:
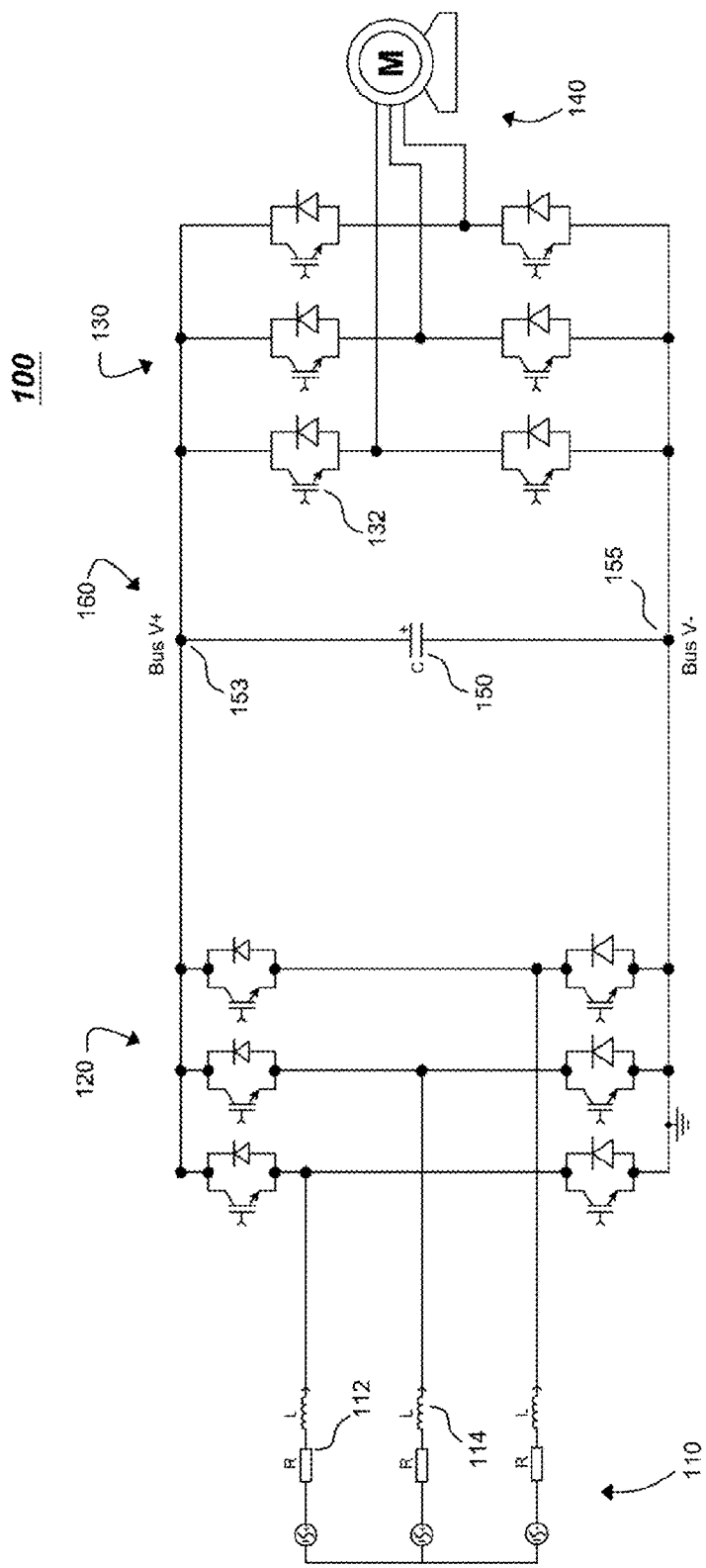
FIG. 1 is a schematic of a related art AC-DC-AC inverter system.

FIG. 1 is a schematic diagram 100 of a related art AC-DC-AC inverter system being fed by an AC grid 110 to rectifying input switches 120, coupled to alternating output switches 130 and finally to a load 140. The AC grid 110 is shown here as being three single phase line inputs with arbitrary line resistances 112 and inductors 114. The input switches 120 are the typical transistor-diode switch 122, controlled by a switching system (not shown). The input switches 120 are arranged in a specific pattern to synchronously rectify the AC grid 110 voltage to create a DC voltage between Bus V+ (153) and Bus V− (155), being stabilized by capacitor 150. For ease of description, the Bus voltage points 153, 155 will hereafter be referred to as the DC-bus 160 or DC-link.

The DC-bus 160 supplies a "stable" DC voltage to a secondary set of "de-rectifying" switches 130, also having the typical transistor-diode 132 configuration, which are controlled by a switching system (not shown) to result in an AC output. The now regulated and controlled AC output is fed to the load 140, shown here, for example, as a motor. Aspects of this related-art architecture are well known and understood in the art and therefore, further elaboration is not provided.

Figure 2:
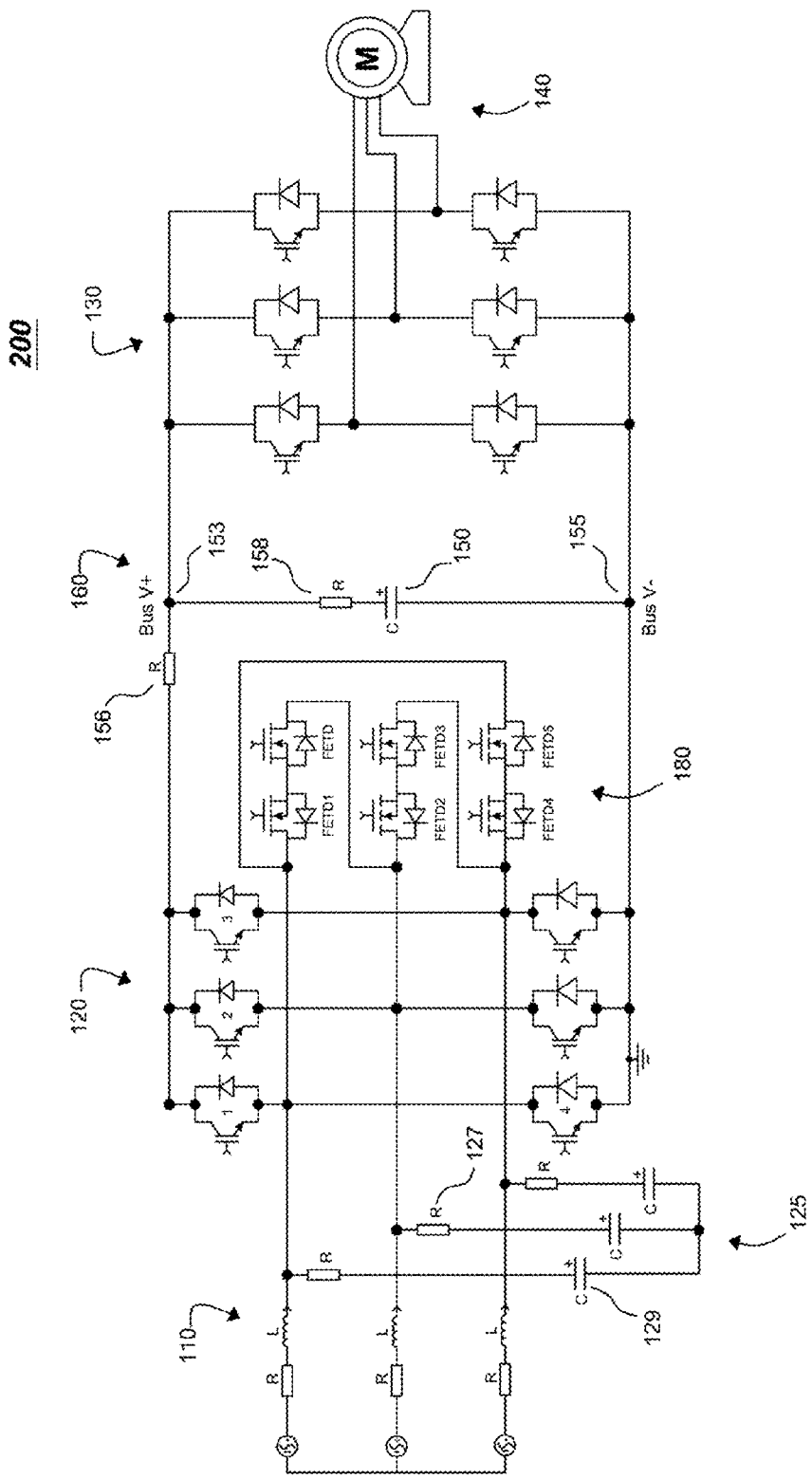
FIG. 2 is a schematic of a related art AC-DC-AC inverter system with bidirectional inverter switches.

FIG. 2 is a schematic diagram 200 of another related art AC-DC-AC inverter system being fed by an AC grid 110 to rectifying input switches 120 in conjunction with bidirectional switches 180, to supply a DC voltage to DC-bus 160, which feeds alternating output switches 130 supplying a regulated AC voltage to load 140. The AC grid 110 is shown in this FIG. with shunting resistors 127 and capacitors 129 added for completeness of the equivalent circuit. Similarly, DC-bus 160, with Bus V+ (153), Bus V− (155) and capacitor 150 is complemented with series line resistance 156 and shunt resistance 158, for completeness of the equivalent circuit.

Other than the added circuit elements, the primary difference in this architecture versus the architecture of FIG. 1 is the addition of the bank of bidirectional switches 180 which are set up in diode-reversed pairs. These switches 180 are typically FETD switches controlled by a system controller (not shown) to allow a balancing of the voltages at the input of rectifying input switches 120. These switches are normally operated with a higher pulse width modulation (PWM) switching frequency than would normally be associated with a conventional rectifier input, resulting in nominally increased efficiency (approximately 95%) and lower Total Harmonic Distortion (THD). The embodiment of FIG. 2 represents the current state-of-the art. Aspects of this related-art architecture are well known and understood in the art and therefore, further elaboration is not provided.

The following FIGS. illustrate aspects of various embodiments of an improved inverter architecture where a rectifying switch arrangement is added to provide power to the DC link. This "double" rectifying architecture operates to enhance power quality, efficiency, and regenerative capability. A specialized switch arrangement is used that operates to rectify and also permits controlled, bi-directional flow of current/voltage. To differentiate this operational mode/arrangement of switches from other switch arrangements, the term "bi-phase" matrix will hereafter be used. The improved architecture also contemplates a separate added DC power source to allow for regeneration from the DC power source. Other aspects and variations of the improved inverter architecture are detailed below.

Figure 3:
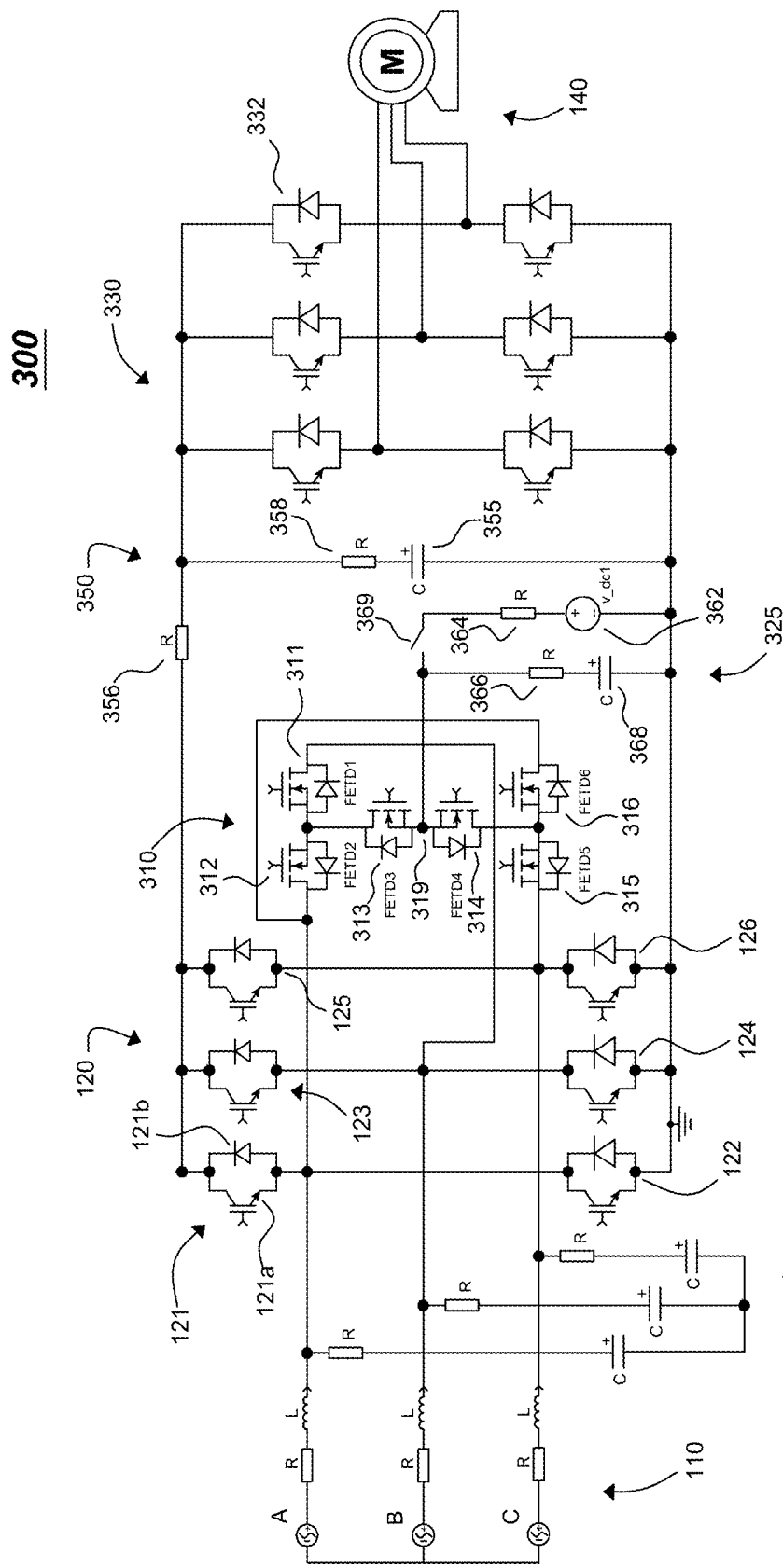
FIG. 3 is a schematic of an inverter system modified with a bi-phase matrix switch operation and DC-energy source for increased efficiency.

FIG. 3 is a schematic diagram 300 of an embodiment of a modified inverter architecture with a rectifying switch configuration 310 (bi-phase matrix) connected to the input of the rectifying input switches 120. A DC source circuit 360, representing one or more independent (or dependent) power supplies 362 such as, for example, a battery, solar cell, etc. is coupled to the midpoint of the bi-phase matrix 310, allowing, in some instances, adjunct DC current to be supplied to the rectifying input switches 120 or, alternatively, a mechanism for storing energy arising from the modified inverter architecture. An optional disconnect switch 369 is provided to allow for opening/closing a path to power supply 362, for possible safety reasons and also to allow operation of the bi-phase matrix 310 independent from the DC source circuit 360/power supply 362.

For completeness of circuit equivalence, particularly in the context of running a circuit simulation, the DC source circuit 360 is illustrated here as having a series resistance 364 with a shunt resistance 366, and shunt capacitance 368. Similarly, the AC grid 110 is shown with shunt resistance 325 and shunt capacitance 325. These resistances, capacitances (and also inductances, if applicable) may be, in some embodiments, considered intrinsic circuit equivalences, which may be considered negligible and ignored, depending on the sophistication of simulation being performed. Accordingly, depending on the "accuracy" desired, these intrinsic equivalences may be removed and the modified inverter architecture may suitably operate.

The output of the rectifying input switches 120 is fed to DC-bus 350, having series and shunt resistors 356 and 348, respectively, and bus capacitor 355 to float a "stable" DC voltage to a set of controlled output alternating switches 330, having a transistor-diode 332 configuration, for AC output. The now regulated and controlled AC output is fed to the load 140, shown here, for example, as a motor. Of course, other load types and circuits interleaved between the load and the output alternating switches 330 may be connected, according to application preference.

While rectifying input switches 120 and output alternating switches 330 may be a simple transistor-diode arrangement, other types of transistors or switching devices that are suitable may be used, according to design preference. For example, in some embodiments, FET (aka—field effect transistors) or insulated gate bipolar transistors (IGBTs) or power MOSFETs, and so forth, may be used. Similarly, the switches of the bi-phase matrix 310 may be of a different type of switching circuit than shown in FIG. 3. The bi-phase matrix 310 operates as a balanced input, controllably bi-directional switching system, regulating current fed into or drawn from the DC source circuit 360.

In operation, input line A's voltage from AC grid 110 three single phase line sources (in 3-phase rotation) will encounter rectifying input switch 121, having transistor 121a paired to diode 121b. If input line A's voltage is positive, then diode 121b will be forward biased and forward the voltage to DC-bus 350, presuming the transistors of rectifying input switches 123, 125 are turned "off." For the negative phase of input line A's voltage, rectifying input switch 122 will provide the negative voltage path to DC-bus 350. As input lines B, C of AC grid 110 phase follow input line A, they similarly are forwarded as they alternate between positive and negative values via their respective +/− paired rectifying input switches (123, 124 and 125, 126). By turning on the transistors at specific points of the input phases, simple rectification is converted to inverter operation.

While input line A's voltage is fed to the rectifying input switches 120, it is also input to bi-phase matrix 310 via switch 312 whose diode is back-biased, preventing default entry to the bi-phase matrix 310. Switch 312 is also connected to input line C of AC grid 110 through the path of lower switch pairs 315, 316, and since the diode of switch 315 is back-biased, default entry of input line C voltage into the bi-phase matrix 310 is prevented. Line B of AC grid 110 is also connected to the bi-phase matrix 310 via switch 311, also being back-biased, preventing default entry of input line B into the bi-phase matrix 310. Therefore, in a first state, input line phases A, B, C are blocked from passing through the bi-phase matrix 310 when the respective switches are turned off.

However, if lower switch 315 is turned on, then input line C's voltage will pass through switch 315 and also pass through switch 316, its diode being forward biased, to arrive at switch 312. If switch 312 is turned on, then input line C's voltage and also input line A's voltage will pass, arriving at junction 317 of the bi-phase matrix 310. Also, if switch 311 is turned on, input line B's voltage will join the voltages of input lines A and C at junction 317. As further progress is blocked by switch 313, when switch 313 is turned on, it allows the voltages to enter via junction 319 to DC source circuit 360 to charge power supply 362.

In another mode of operation, if (upper) switch 313 is turned off, the paths for input lines A, B, C can be altered by turning on/off various bi-phase matrix 310 switches to allow the voltages to enter via (lower) switch 314 rather than (upper) switch 313. For example, input line A's voltage can bypass around "blocked" switch 312 to enter turned on switch 316 via the outer path to arrive at switch 314. Input line B can enter via turned on switch 311 and travel through the forward-biased diode of switch 312 to follow input line A's path and arrive at switch 314. Input line C can enter through turned on switch 315 to arrive at switch 314.

In yet another mode of operation, both switches 313, 314 can operate to coordinate entry into bi-phase matrix 310. For example, input lines A and B may follow the paths described in the first example via switch 313 while input line C may follow a path through directly through switch 315 and 314. Of course, it is understood that in some switching circuits, the selection of path is dependent on the relative impedance of the transistor as compared to the associated diode, and it may be necessary to add additional switches to guarantee appropriate pathway selection. As one illustration, in the previous example, input line C, rather than traveling from switch 315 directly to switch 314, may prefer to travel through the forward biased diode of switch 316. Accordingly, another switch (or controllable diode or equivalent) could be devised between switches 316 and 312 to prevent this travel path. As is evident, the embodiment of FIG. 3 lends itself to multiple modes of operation, which can be facilitated by operating the bi-phase matrix 310 switches in a coordinated manner. Therefore, one of ordinary skill in the art may make modifications to the embodiments shown without departing from the spirit and scope of this disclosure.

Since input lines A, B, C of AC grid 110 are in phase relationship, operation of the various switches in the bi-phase matrix 310 can be coordinated to afford efficient superpositioning of the respective voltages and control of when/how much voltage will pass to DC source circuit 360, by selection of the desired paths in view of the phase relationships and/or line voltages. As one possible example, if one of the input line voltages is not of the same amplitude or phase relation as the remaining line voltages, a degree of compensation can be achieved by coordinating which line voltages will travel through which path/switches.

For situations where the line voltage is lower than normal or where it a situation requires the DC source circuit 360 to provide voltage addition to the system, power from power supply 362 is conveyed through the diodes associated with switches 313 and 314, to in-line switches of 311, 312 and 315, 316, respectively. The final rectification phase is carried out by the diodes associated with the rectifying input switches 120.

As is apparent, switching control of the rectifying input switches 120 can be part of a traditional rectifier/inverter scheme to provide synchronous rectification, and may be operated by traditional space vector modulation/control (SVM). Similarly, switching control of the bi-phase matrix 310 may be via SVM. The switching logic can be an automated (e.g., computerized) system using decision logic (e.g., software) for a desired mode of operation or performance. Feedback and/or other system inputs may be utilized in such an embodiment. While SVM is articulated as one scheme for switch control, it is well understood that other forms of switch control (traditional and/or non-traditional) may be utilized and, therefore alternative switching schemes and/or switch control may be utilized without departing from the spirit and scope of this disclosure. Recognizing the embodiment of FIG. 3 as being capable of being bi-directional in operation, the switch control topology can be responsible to carry out regenerative functions. By implementing a bi-phase matrix 310, the efficacy and robustness of regeneration can be obtained through appropriate switch control.

With respect to switch behavior, synchronous zero voltage crossover switching can enhance the overall efficiency. Accordingly, for example, switches 313, 314 provide "bucking" energy back to the DC source circuit 360 for energy replenishment in the case that the DC power source 362 is either a battery, or ultracapacitor, for example.

Figure 4:
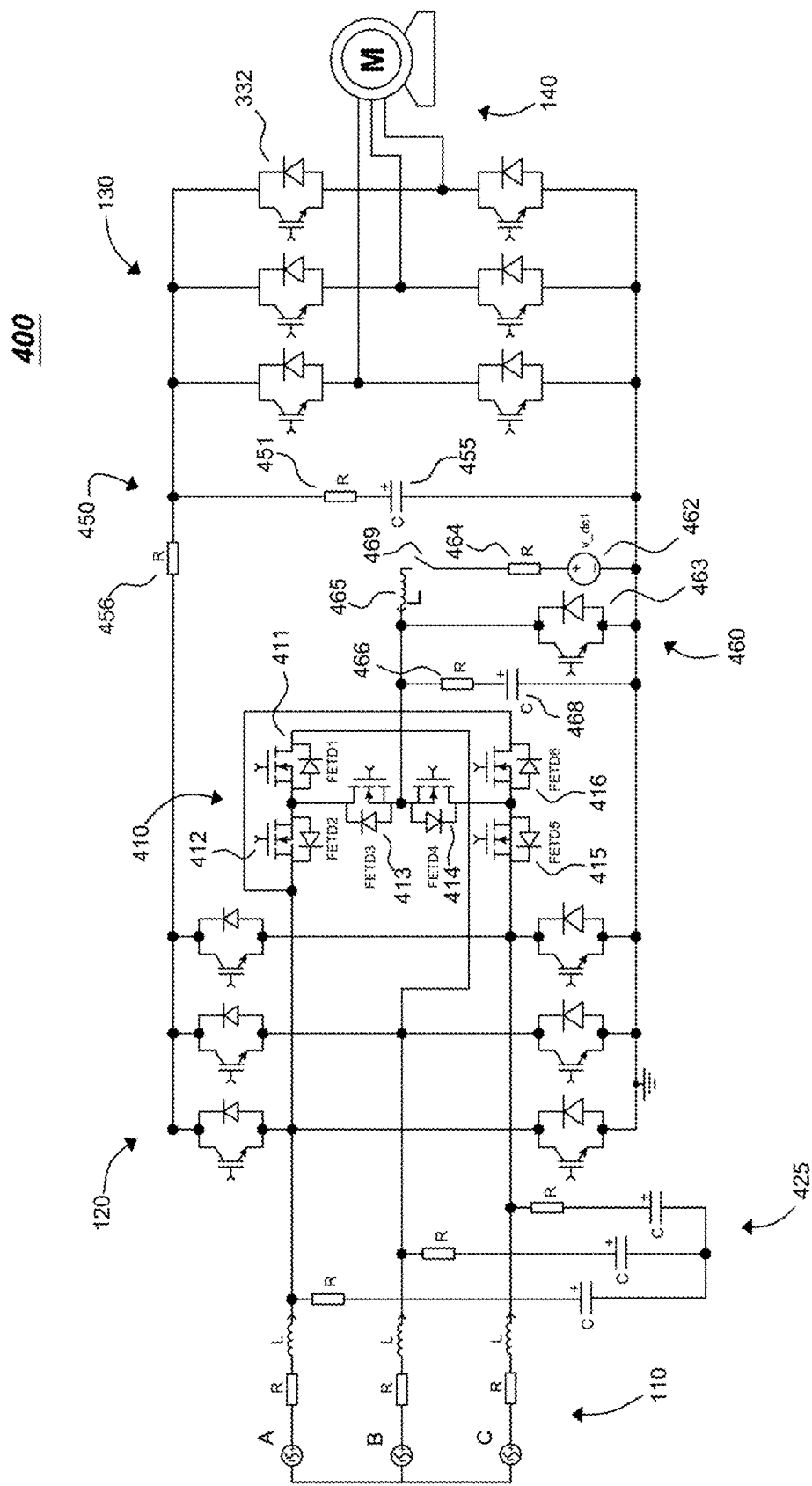
FIG. 4 is a schematic of the embodiment of FIG. 3 modified with a DC boost circuit.

FIG. 4 is a schematic diagram 400 of the embodiment of FIG. 3 modified with a boost switching circuit 463. AC grid 110 is shown with shunting elements 425, in conjunction with rectifying input switches 120 coupled to bi-phase switches 410. The bi-phase switches 410 are center fed by DC-source circuit 460 having assorted resistors 464, 466, capacitor 468, inductor 465, with power source 462, and also connected to boost switching circuit 463. This additional circuit 463 was found to beneficial, as a means for hosting the ability to control a pre-determined increase in voltage at any time by changing the duty cycle of the circuit 463. While FIG. 4 illustrates a boost switching circuit 463 in a transistor-diode pair, additional circuit elements may be added, according to design preference. As boosting circuits are well known, modifications within the purview of one of ordinary skill in the art may be made art without departing from the spirit and scope of this embodiment. As one non-limiting example, the boost switching circuit 463 may be of an alternative design/configuration, etc., having multiple stages, either in series and/or parallel.

Figure 5:
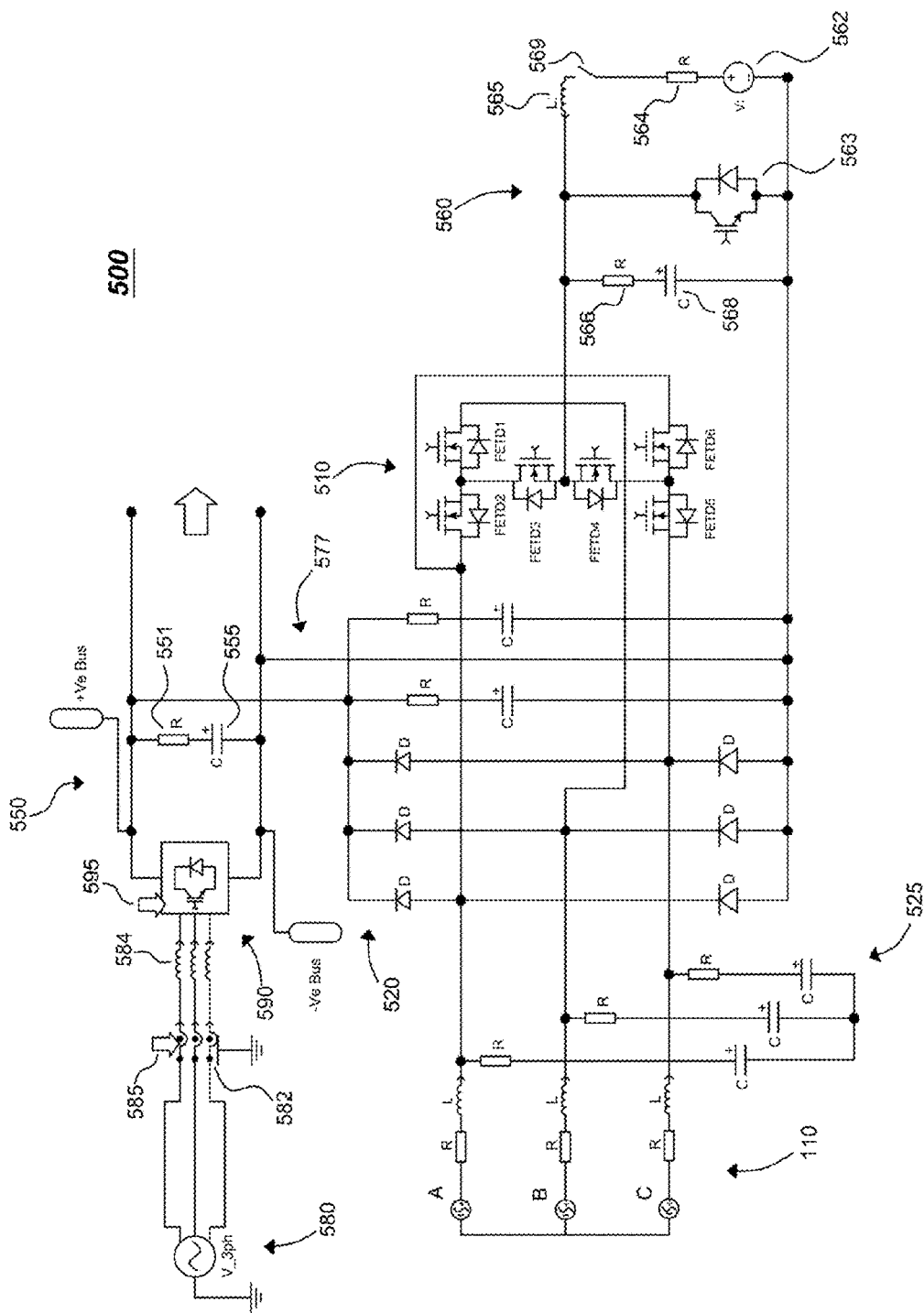
FIG. 5 is a schematic of the embodiment of FIG. 4 with two 3-phase line sources.

FIG. 5 is a schematic diagram 500 of a multi-single phase and 3-phase system using a rectifier-based embodiment of FIG. 4's architecture. This embodiment contemplates a multiple "input" source paradigm where single phase, 3-phase, and backup DC sources are "controllably" connected to provide an integrated and robust power delivery system. The load-side DC-to-AC rectifier/inverter and load is omitted in this diagram 500 for ease of illustration, and in doing so presents an architecture that is capable of connection to a multi-load and/or multi-DC-to-AC rectifier/inverter, as will be more apparent below.

In this embodiment, 3-phase AC grid 110 input lines feed into a simple switchless rectifier matrix 520 having shunt resistances/capacitances 525. The rectifier matrix 520 is complemented by bi-phase matrix 510 containing DC-source circuit 560 having shunt resistance 566, shunt capacitance 568, DC-boost circuit 563, series inductance 565, shut-off switch 564, series resistance 564 and DC power supply 562. These elements are similar in function to the corresponding elements described in the embodiment of FIG. 4, in that backup or supplemental power can be obtained from DC power supply 562. As further evident below, it is recognized for this embodiment that the mechanism for "charging" the DC power supply 562 will naturally arise from the DC-bus 550 through appropriate switch paths in the bi-phase matrix 510. However, in some variations of this embodiment, it is contemplated that inverter module 590 from 3-phase input 580 can be configured to operate as a charging source for DC power supply 562, as it can have the necessary set of switches to carry out the regenerative function, as in other configurations. Therefore, modifications to this arrangement to arrive at additional functionalities are within the scope of one of ordinary skill in the art.

The rectifier matrix 520 is complemented by secondary AC input line source, which in this illustration is presented as 3-phase input 580, containing tap 582, line inductances 584, and inverter module 590, typically having 6 transistor-diode bridges (not shown). The inverter module 590 is shown as a single element, but actually is a module that contains a controllable inverter architecture that can be bidirectional and produces a DC output. Tap 582 provides a control signal 585 for current and/or voltage (phase) information for coordinating control and signaling 595 of inverter module 590. Control can be achieved by a computer or logic chip (not shown) and may utilize SVM or other applicable modulation schemes for coordinating entry of the 3-phase input 580 voltage (now rectified) to DC-bus 550. The bi-directional nature of inverter module 590 provides a mechanism for excess voltage on the DC-bus 550 to be transferred to 3-phase input 580 for regenerative purposes, if so needed.

Therefore, in addition to DC-bus 550 being coupled to rectified single phase AC grid 110 voltage and, if desired, to DC power supply 562 voltage, the DC-bus 550 is also be coupled to rectified 3-phase input 580 voltage via connection bridge 577. Connection bridge 577 provides a convenient mechanism for "joining" the rectified outputs of AC gird 110 and 3-phase input 580. Wherein DC-bus 550 provides an output channel to an AC-producing inverter (not shown) or respective load (not shown). It is understood that connection bridge 577 may contain a switch for connection or disconnection, depending on implementation preference.

As is apparent, for some embodiments the nature of deployment may be such that the load is a DC load and therefore an intervening AC-producing inverter may not be necessary. Therefore, via the various controllable connections provided in this embodiment, combinations of the single phase AC grid 110, 3-phase input 580, DC power supply 562 can be devised for supporting a desired load(s) or load type.

It should be noted that the above embodiment can be understood as providing a dual path formed from a separate rectifier matrix 520, bi-phase matrix 510, and inverter module 590, to perform the function of three phase rectification from separate three phase AC input sources. The outputs of these two rectifier architectures are combined at the DC-bus 550 to enhance power quality, efficiency and regenerative capability. Since the rectifier architecture 520 supporting the bi-phase matrix 510 can be uni-directional, it can be responsible for creating a higher quality DC-bus 550 voltage for instances where step loads occur. Concomitantly, the rectifier architecture 590 supporting the 3-phase input 580 is bi-directional and therefore enables the commuting of regenerative energy back to the 3-phase input 580.

It is understood that some circuit elements shown in the above embodiments may be superficial or replaced with an equivalent circuit (series vs. parallel, for example) or added to, and therefore while various series/shunt inductors, capacitors, and resistors (as well as diodes) are illustrated in the particular configuration shown, alternate configurations, as well as additions or subtractions, may be contemplated by one of ordinary skill in the art, without departing from the spirit and scope of this disclosure.

For example, some resistances, capacitances (and also inductances, if applicable) may be, in some embodiments, considered intrinsic circuit equivalences, which may be considered negligible or ignored, depending on the sophistication of simulation being performed. Accordingly, depending on the "accuracy" desired, these intrinsic equivalences may be removed and the modified architecture may suitably operate.

While FIG. 5 illustrates various switches in a transistor-diode pair, additional or different circuit elements may be added, according to design preference, for example, having multiple stages, multiple diodes, and so forth. Also, on/off terminology is dependent on the mode and default state of a transistor/switch, therefore, the term "on" may imply turning "off" the voltage/current to the transistor (or switch) to allow passage. Further, while "voltage" is described as the power parameter, current may be used as the power parameter, as appropriate.

By way of illustration from FIG. 5, the embodiments of FIGS. 3 and 4 can be modified by incorporating a connecting bridge that connects a second 3-phase AC line input source to the representative DC-bus. Pursuing this approach, it can further be seen that while two rectifier/inverter architectures can be implemented in the embodiment of FIG. 5 and also by extension to the embodiments of FIGS. 3-4, three or more rectifier/inverter architectures can be implemented by appropriate bridging. The bridging aspect enables not only support for a plurality of rectifier/inverters, it is capable of supporting a plurality of loads (via bridging directly to the plurality of loads), as is further explored below in the descriptions of the embodiments of FIGS. 15A-F.

Figure 6:
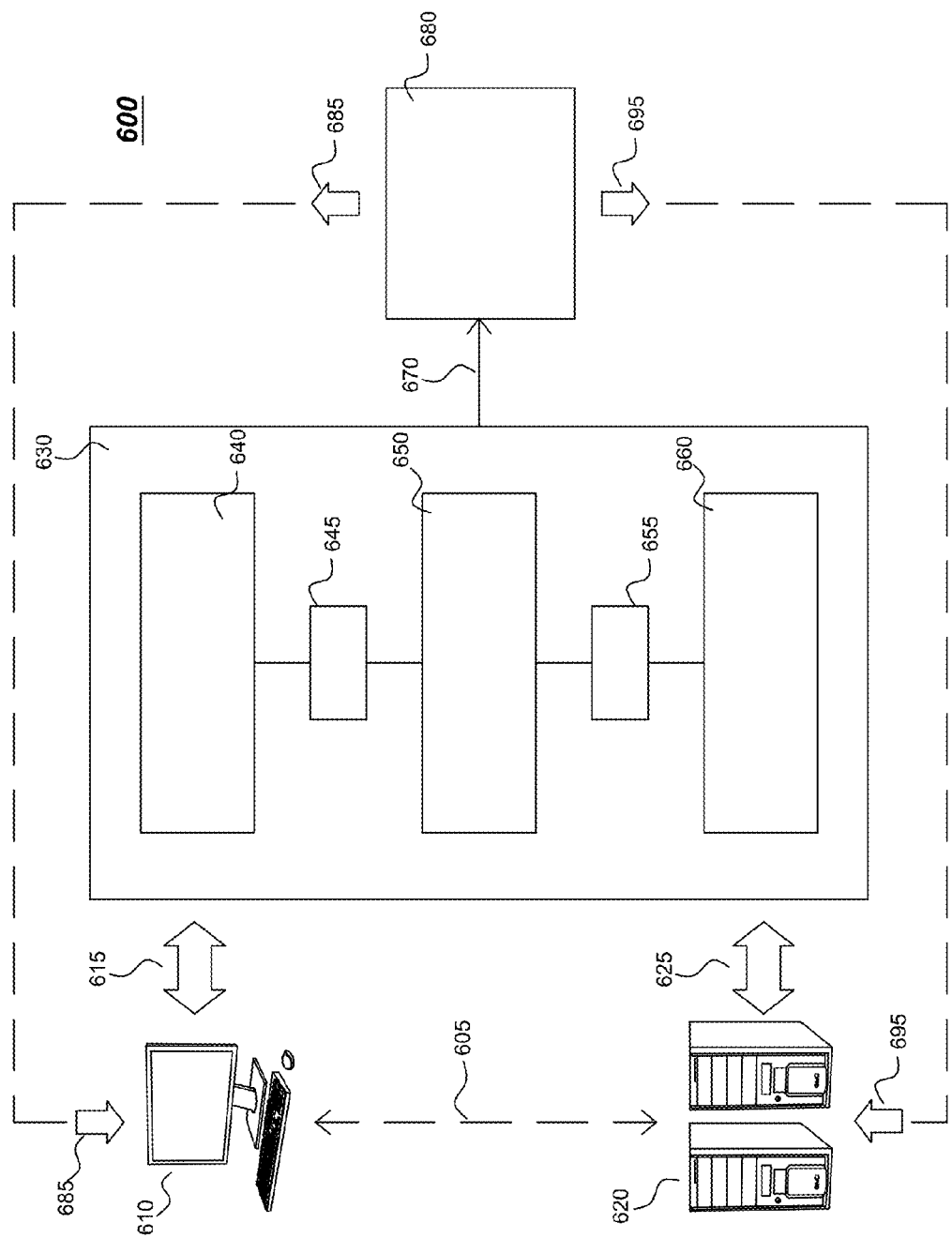
FIG. 6 is a block diagram of a modified inverted system under controller operation.

FIG. 6 is a block diagram 600 of a modified inverter system under controller operation. A computing device 610 provides control signals to inverter system 630 via communication link 615. Communication link 615 can be a one-way or two-way signal, depending on implementation preference. Computing device 610 can be part of a network, by communicating to a server of the server system 620 via communications link 605, depending on implementation preference. Server system 620 can also provide control signals to inverter system 630 via communications link 625. Communication link 625 can be a one-way or two-way signal, depending on implementation preference. Also, computing device 610 may operate independent of server system 620 or operate in coordination with server system 620. In some embodiments, computing device 610 may be part of inverter system 630 and constitute a stand-alone system, with no or only as needed communication to exterior computers such as server system 620.

Control signals sent via communications links 615, 625 provide switching signals for various switches (transistor and/or non-transistor based switches, etc.) within inverter system 630. For example, elements 645 within inverter system 630 may be a connection bridge between three phase power input 640 to single phase power input 650. And element 655 within inverter system 630 may be a connection bridge between DC power source or circuit 660 to single phase power input 650. In some embodiments, three phase power input 640 may be removed, leaving only single phase power input 650 and DC power source/circuit 660. Similarly, DC power source/circuit 660 may be removed, leaving only three phase power input 640 and single phase power input 650. Other combinations may be contemplated. Connection bridges 645, 655 can be controllable switches that are controlled via control signals from links 615, 625, or may be hard-connections without any ability for control, depending on implementation preference.

Communications links 615, 625 can also provide feedback, tap information from the switches or from other parts of the inverter system 630. Feedback to computing device 610 and/or server system 620 can also arise from communication links 685, 695, which can come from load 680, which is connected to inverter system 630 via DC-bus 670. One or more of the communication links 605, 615, 625, 685, 694 may be wireless, depending on design preference. Communication links 685, 695, though shown as only having one-way communications, may have two way or one-way in the reverse direction, according to design preference. For example, direct control of a cutoff switch (not shown) at the load 680 may be afforded through control signals sent from computing device 610 and/or server system 620 to load 680.

FIG. 6's block diagram 600 is offered to illustrate one of many possible communication pathways between controller(s) (e.g., computer or processor) and various functional blocks in bi-phase matrix modified inverter systems. It is understood that such controller(s) will utilize software-based commands and logic to provide the appropriate control and switching of various connections and/or switches in bi-phase matrix modified inverter systems. And based on the configuration chosen and performance objectives desired, it is understood that using the template offered in FIG. 6, various modifications to the connections and logic/switching decisions may be made by one of ordinary skill in the art without departing from the spirit and scope of this disclosure. As one possible hardware based example, computing device 610 may communicate with a processor (not shown) interior to inverter system 630, being "integrated" therein and the processor may provide the logic/switching decisions. As one possible software based example, one switching scheme for a set of switches may be SVM based while another switching scheme (non-SVM) for another set of switches.

Figure 7:
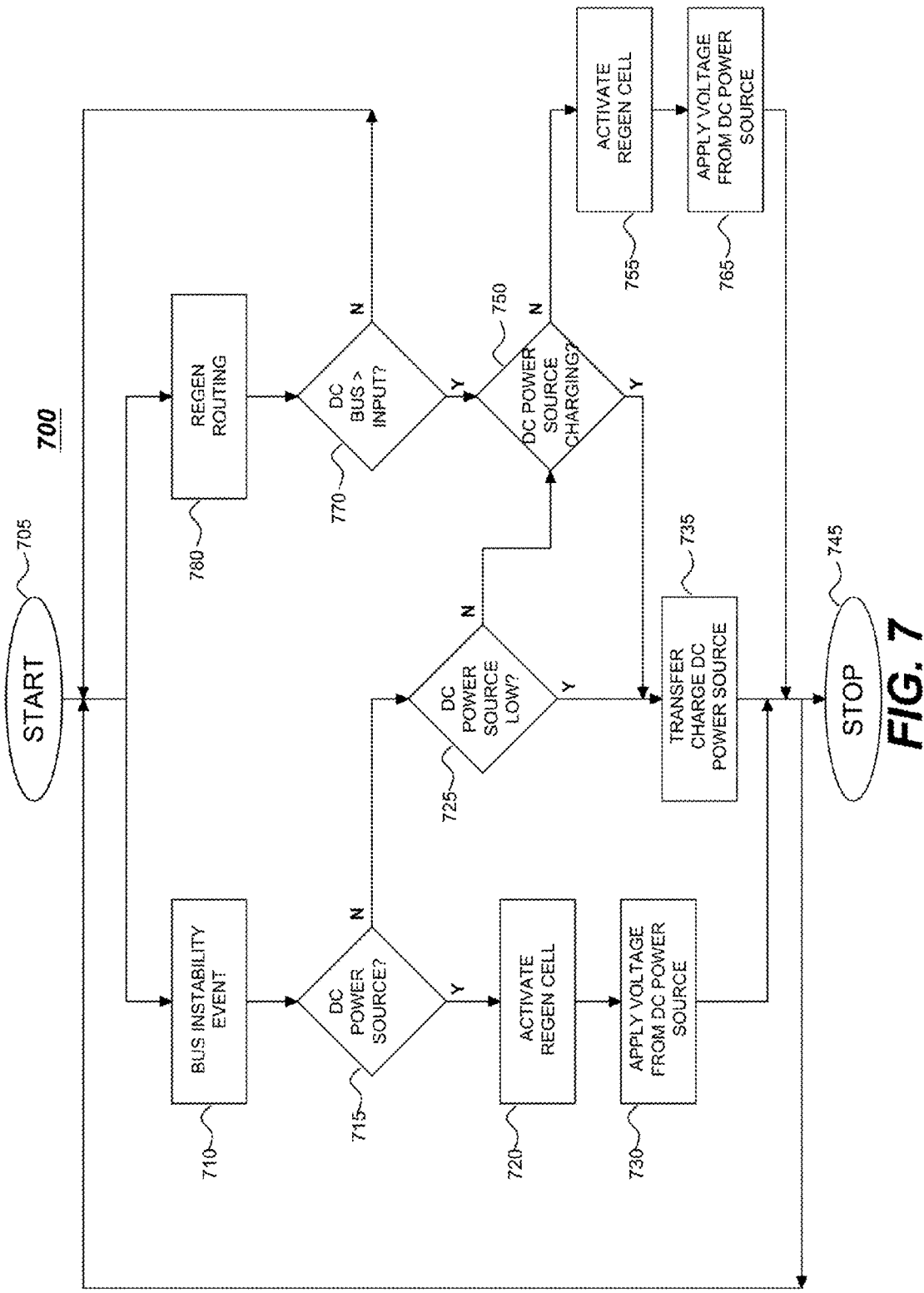
FIG. 7 is process flow chart for event-based actions for a modified inverted system under controller operation.

FIG. 7 is a flow process 700 illustrating event-based control of a bi-phase matrix with DC-power circuit supplemented inverter/rectifying system, upon detection of a "problem" event that requires power system adjustment. For ease of description, the events are categorized into two sets, corresponding to DC-Bus instability 710 and Regenerative Energy Routing 780, however, they may be separated into smaller sets, depending on implementation preference. The process 700 will start 705 with monitoring a status of the power system, to detect of any one or more of these disturbance "events." Detection of a DC-Bus Instability event 710, typically arising from an AC-Grid power fluctuation (e.g., brown out) or Load Torque perturbation (e.g., start/stop/heavy load), etc., will trigger the process 700 to inquire if the DC Power Source is available 715 for use as a power source to supplement the power to the load. If the DC power source is understood to be available, the process 700 will activate the regenerative cell operation 720, which "kicks in" the DC power source as a supplemental or replacement power source by applying step-voltage for "ride-through" the DC-Bus link from the DC power source 730.

It is understood, in the context of this flow process 700, that the term regenerative cell operation denotes operation of the power system using one or more of its secondary power systems (for example, DC power supply, 3-phase power, and so forth). Upon the activation or completion of the ride through 730, the process 700 can stop 745 or loop back to Start 701 for further event monitoring.

If, in Step 715, the DC power source is understood to not be available, the process 700 will proceed to inquire if non-availability is due to the DC power source having a low voltage condition 725. If low voltage condition 725 is found to be true, the process 700 will proceed to invoke a charging operation by transferring available regenerative energy to the DC power source 735, whereupon upon completion the process 700 can stop 745 or loop back to Start 705 for further event monitoring. This flow path, of course, presumes that regenerative energy is available.

If low voltage condition 725 is found not to be true, then the process 700 will proceed to inquire if the DC power source requires charging 750. If the DC power source requires charging 750, the process 700 will proceed to step 735—transferring (if) available regenerative energy to the DC power source. Upon the activation or completion of this function, the process 700 can stop 745 or loop back to Start 705 for further event monitoring.

At step 750, if the DC power source does not require charging, the process 700 proceeds to activate the regenerative cell operation 755, which in this instance involves setting the appropriate switches for any regenerative energy to be transferred to the AC Grid 765 (for example, for rebate purposes, etc.). After activation or completion of this function, the process 700 can stop 745 or loop back to Start 705 for further event monitoring.

For the scenario where the triggering event is in regards to Regenerative Energy Routing 780, beginning with Start 705, the process 700 will monitor excess voltage from the Output Load Source or DC-Power Source, etc. Detection of over-voltage will trigger the process 700 to inquire if the DC Bus Voltage is genuinely greater than the Input Voltage 770 and not the result of a transient voltage. If the DC Bus Voltage is actually determined to be less than the Input Voltage, then the process 700 will ignore this event trigger and return to Start 705 for further event monitoring. However, if the DC Bus Voltage is found to be greater than the Input Voltage 770, then the process 700 will proceed to inquire if the DC power source requires charging 750. If the DC power source requires charging 750, then the process 700 will proceed to invoke a charging operation by transferring available regenerative energy to the DC power source 735, whereupon upon completion the process 700 can stop 745 or loop back to Start 705 for further event monitoring.

At step 750, if the DC power source does not require charging, the process 700 proceeds to activate the regenerative cell operation 755, which in this instance involves setting the appropriate switches for any regenerative energy to be transferred to the AC Grid 765. After activation or completion of this function, the process 700 can stop 745 or loop back to Start 705 for further event monitoring.

The following FIGS. are computer simulations of a related art inverter system compared to modified inverter embodiments described above, in different modes of operation, showing performance improvements over the related art. DC Bus voltages, input phase currents, DC link current, Motor stator currents, and Positive & Negative load steps as a function of time (seconds) are plotted for comparison purposes.

Figure 8:
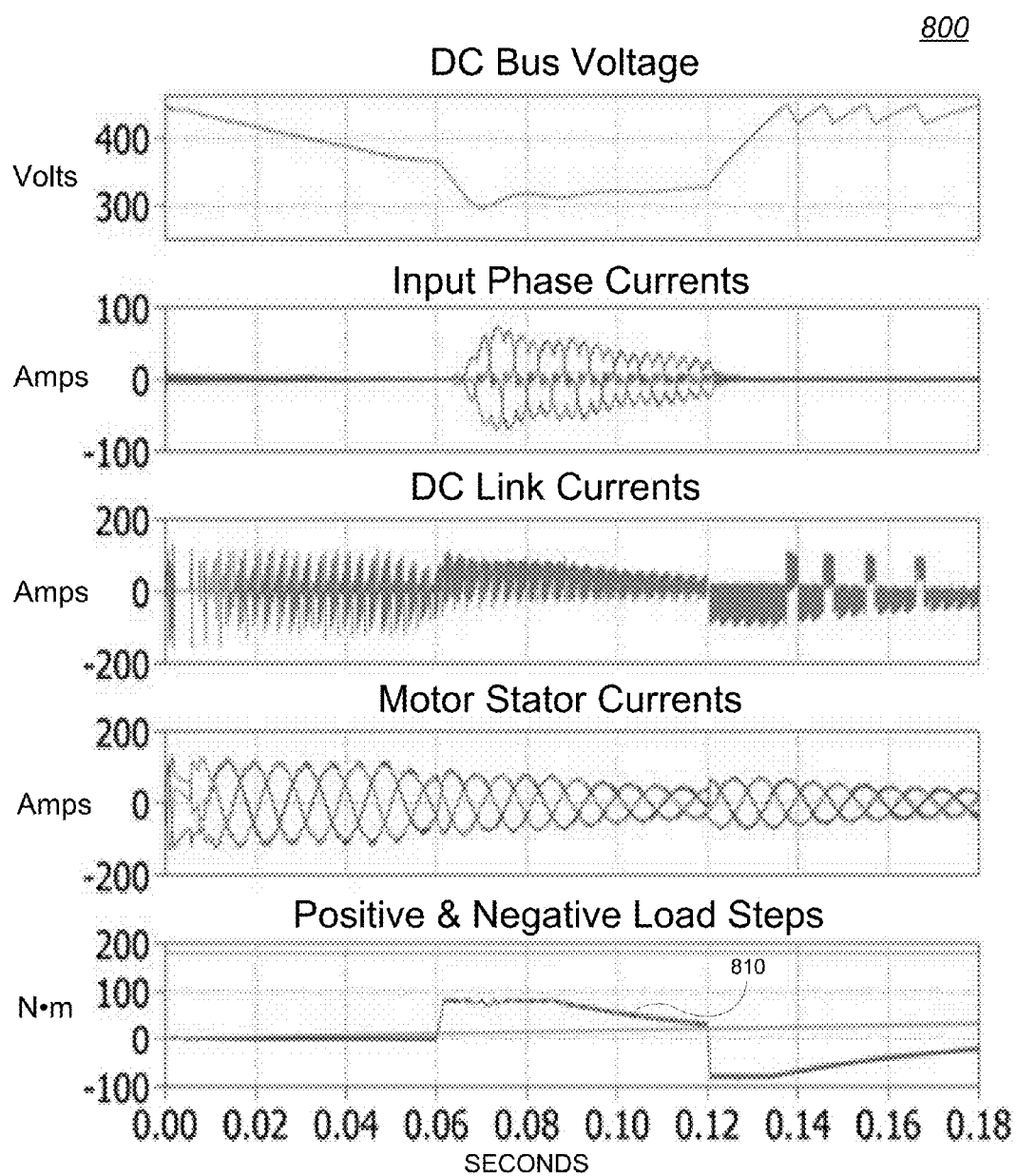
FIG. 8 is a plot of a computer simulation of the related art embodiment of FIG. 1.

FIG. 8 is a plot 800 of a computer simulation of the related art embodiment of FIG. 1. No bi-phase matrix or DC power source is utilized. This embodiment operates as a traditional 6-switch bridge rectifier system. The effects of a motor load shifting from positive to negative 100 N·m (810) at the motor shaft are seen in the DC-Bus voltage and DC-Bus link current plots. The DC-Bus voltage was calculated to have a minimum of 300V and a maximum of 430 through the load shift. The RMS value was computed as 375V. The distortion of the Input Phase Currents is attributed to the low voltage response of the rectifier system.

Figure 9:
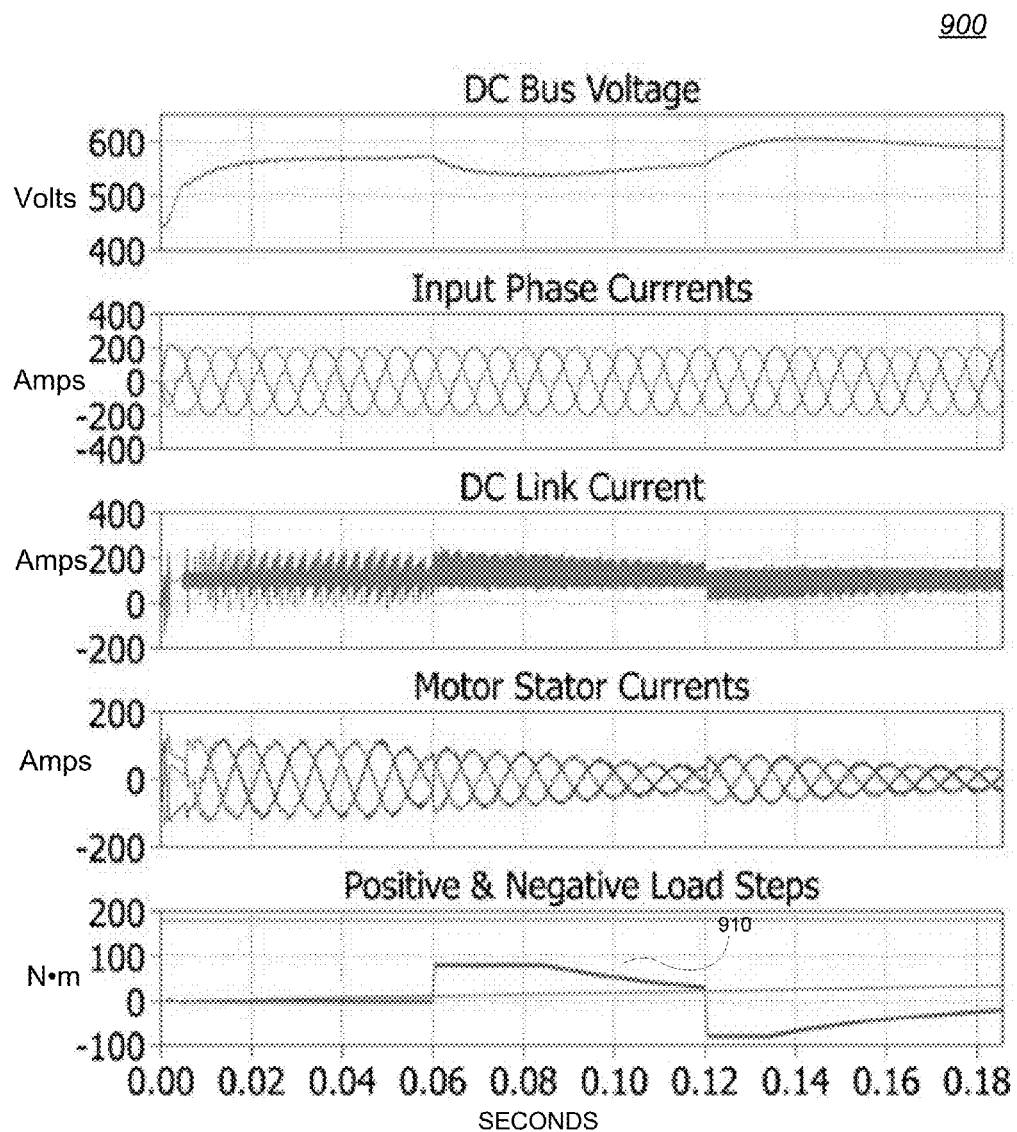
FIG. 9 is a plot of a computer simulation of the embodiment of FIG. 4 without boost.

FIG. 9 is a plot 900 of a computer simulation of a modified inverter system corresponding to the embodiment of FIG. 4 whereby a DC voltage of 200V is added to the intersection of switch 413 (FETD3) and switch 414 (FETD4). This action simulates the transmuting of the DC power source's 460 output voltage (e.g., 200 VDC) to the DC-Bus 450, in a regenerative mode where the DC power source is used to supplement the input AC Grid 110 power. The effects of a motor load shifting from positive to negative 100 N·m (910) at the motor shaft are seen in the DC-Bus voltage and DC-Bus link current plots. The minimum value of the DC-Bus voltage was computed to be 534V while the maximum value of the DC-Bus voltage was 608V, through the load shift, giving an RMS value of 567V. A significant improvement in the general system response is evident over the related art embodiment of FIG. 1. A near 200V RMS increase in the DC-Bus voltage is evident. The insertion of a positive DC-offset voltage via the bi-phase matrix 410 configuration enhances the power quality of the input currents and reduces the distortion when positive, or negative, step loads are applied.

Figure 10:
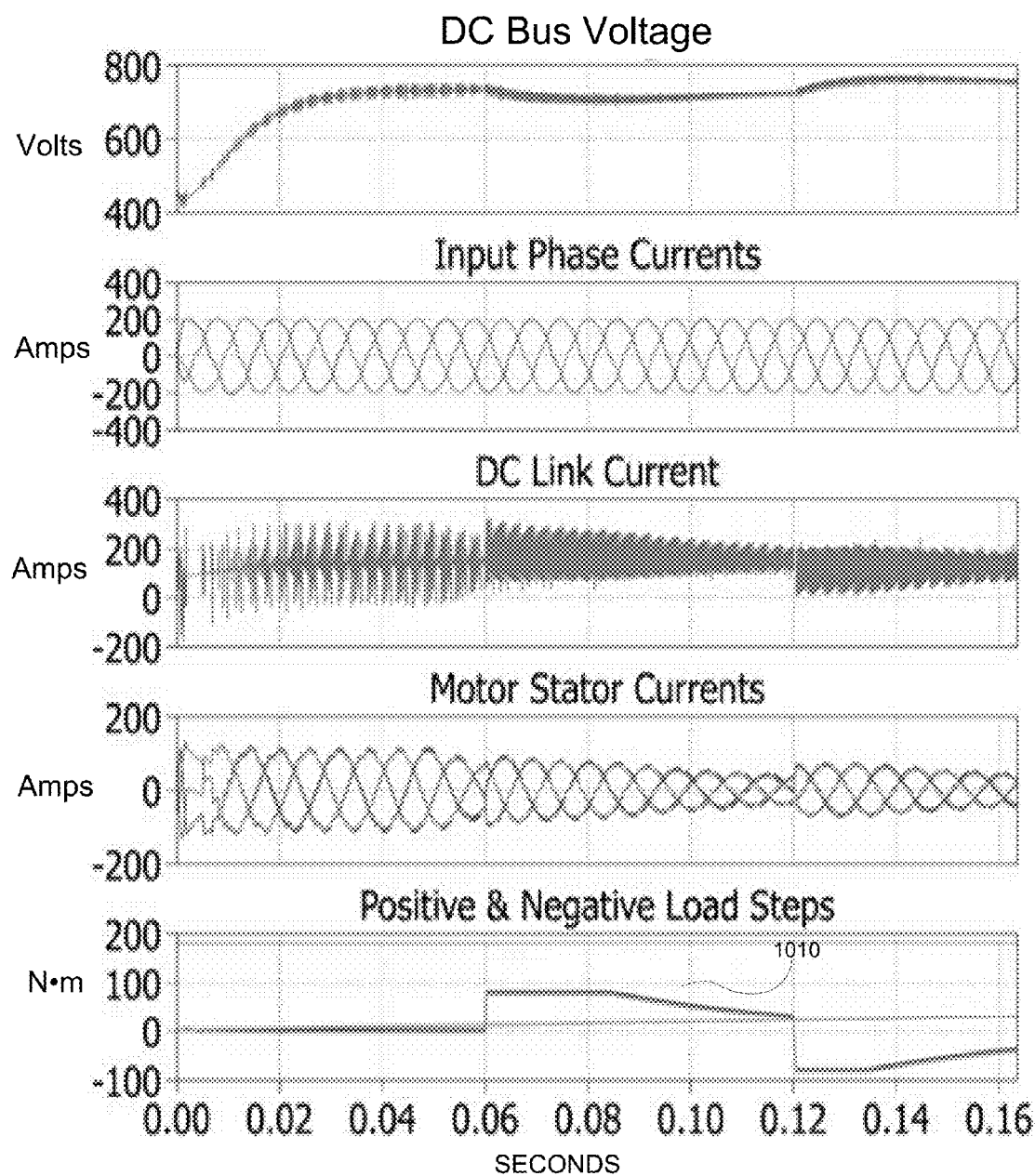
FIG. 10 is a plot of a computer simulation of the embodiment of FIG. 4 with boost.

FIG. 10 is a plot 1000 of a computer simulation of the embodiment of FIG. 4 whereby a DC voltage of 200V is added to the intersection of switch 413 (FETD3) and switch 414 (FETD4) and boost switching circuit 463 is engaged. This simulates the transmuting of the DC power source's 460 output voltage (e.g., 200 VDC) to the DC-Bus 450 with the boost switching circuit's 463 contribution, in a regenerative mode where the boosted DC power source is used to supplement the input AC Grid 110 power. The effects of a motor load shifting from positive to negative 100 N·m (1010) at the motor shaft are seen in the DC-Bus voltage and DC-Bus link current plots. The minimum value of the DC-Bus voltage is 688V while the maximum value of the DC-Bus voltage is 770V, through the load shift, giving an RMS value of 730V. This RMS value is nearly 170V higher than that experienced in the simulation of FIG. 9.

From this plot 1000, the "simple" boost switching circuit 463 appears to be very effective in increasing the voltage to the load when under heavy demand. The bi-phase matrix 410 enables the voltage from the boosted 463 DC power source 460 to provide a voltage that can be used to either increase the robustness of the DC-link against output load changes, or provide compensation for grid brown-out events, for example. Various simulation results have demonstrated that by controlling the duty cycle of the boost switching circuit 463, the delta between the minimum to maximum DC-link voltage swing can be maintained to within 5% of target values, throughout load excursions.

As stated above, feedback mechanisms can be used to further refine the control aspects described herein. The boosting of the DC power source 460 can be controlled to occur on an as-needed basis, for example, when experiencing heavy load perturbations, or for other disturbances. The "amount" of boost can also be controlled. Therefore, this embodiment is more efficient allowing for various as-needed responses.

Figure 11:
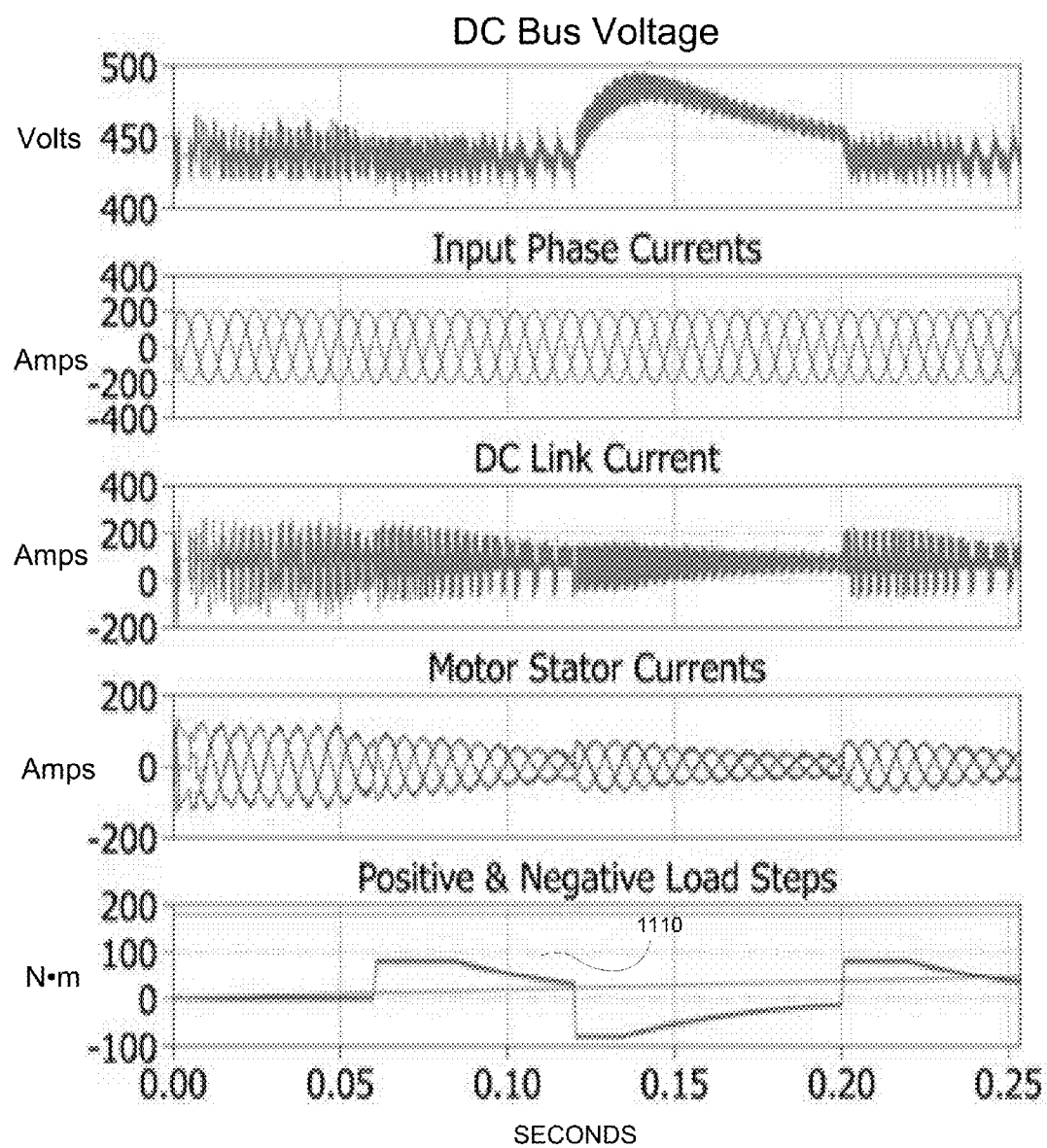
FIG. 11 is a plot of a computer simulation of the embodiment of FIG. 4 without DC power source contribution.

FIG. 11 is a plot 1100 of a computer simulation of the embodiment of FIG. 4 whereby the DC power source 460 is not "connected" to the bi-phase matrix 410, due to switches 413 (FETD3) and 414 (FETD4) being in a switched mode to block the contribution of voltage from the DC power source 460. Of course, this can also be accomplished by opening switch 469. Nonetheless, in a non-DC power source supplemented mode, the DC-Bus voltage has a minimum of 408V and a maximum of 496V during the positive to negative 100 N·m torque change 1110 at the motor shaft. The RMS voltage was calculated to be 450V. While the bi-phase matrix 410 is considered to be in operation, the lack of contribution from the DC power source 460 is evident in the reduced DC-Bus voltage. Evident in this plot is the higher harmonic content of the DC link voltage, resulting from the absence of the DC power source's 460 contribution.

The summary from the above plots is that integration of a bi-phase matrix with a DC power source into a conventional rectifier/inverter power system will significantly enhance the stability, efficiency, and power quality of three-phase AC regenerative rectification systems.

Figure 12:
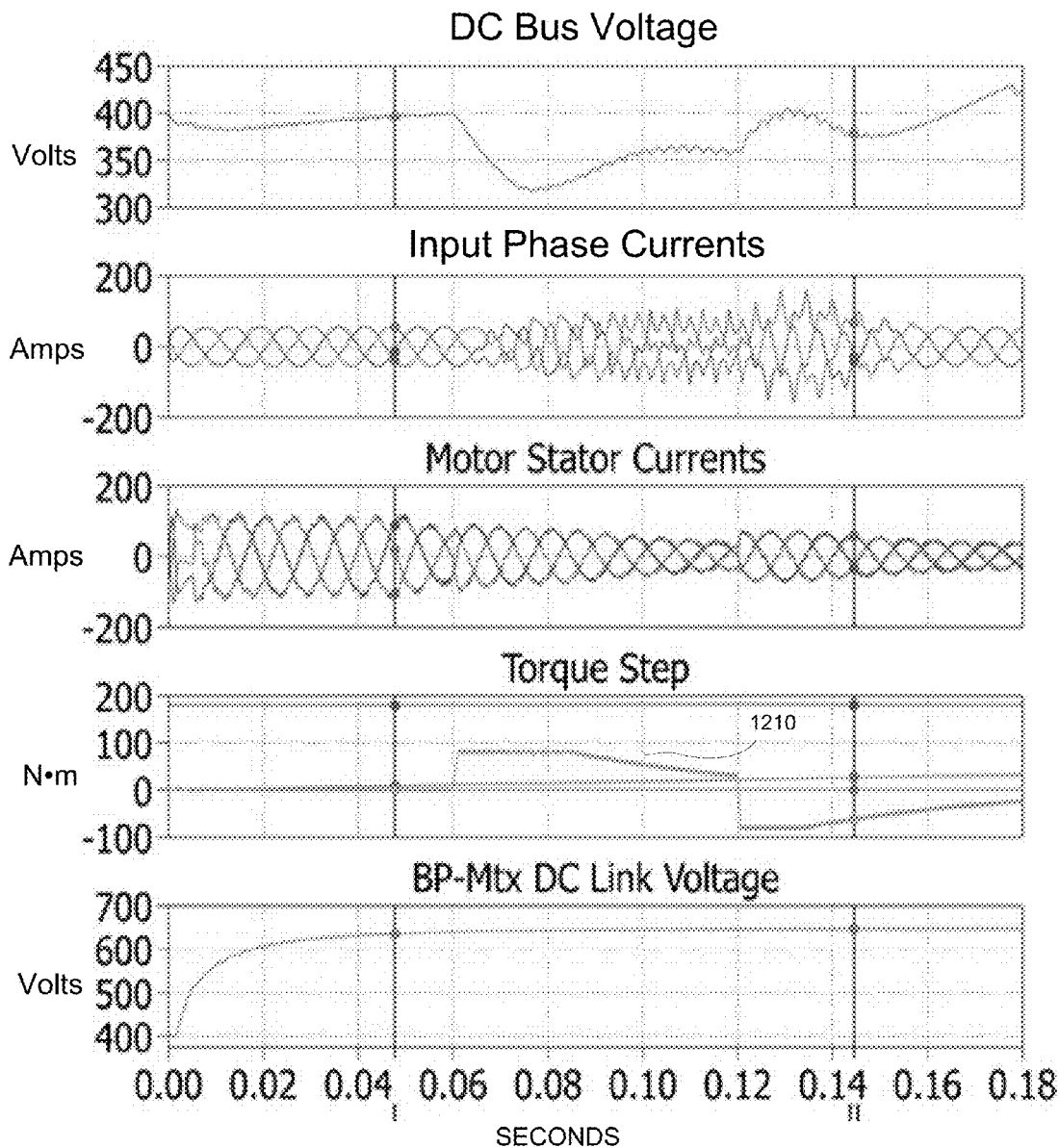
FIG. 12 is a plot of a computer simulation of the embodiment of FIG. 5 without a common link between rectifier systems.

FIG. 12 is a plot 1200 of a computer simulation of the embodiment of FIG. 5, without the DC link 577 link between rectifier inverter module 590 and rectifier matrix 520. The plot of the DC V voltage represents the DC-bus 550 voltage from the rectifier inverter module 590 (coupled to 3-phase input 580) to a load, with no connection to bi-phase matrix 510. The plot of the Bi-Phase Matrix voltage represents the DC-bus 550 voltage from the bi-phase matrix 510 to a load. These plots show the response of the respective rectifier systems operating independently from each other.

For a 100 N·m torque change 1210 at the motor shaft, the ensuing DC V voltage was calculated to have a minimum of 317V and maximum of 405V, with an RMS voltage of 365V. The corresponding Bi-Phase Matrix voltage was calculated to have a minimum of 635V and maximum of 646V, with an RMS voltage of 643V. No energy was provided by DC power source 560 for the Bi-Phase Matrix simulation.

Figure 13:
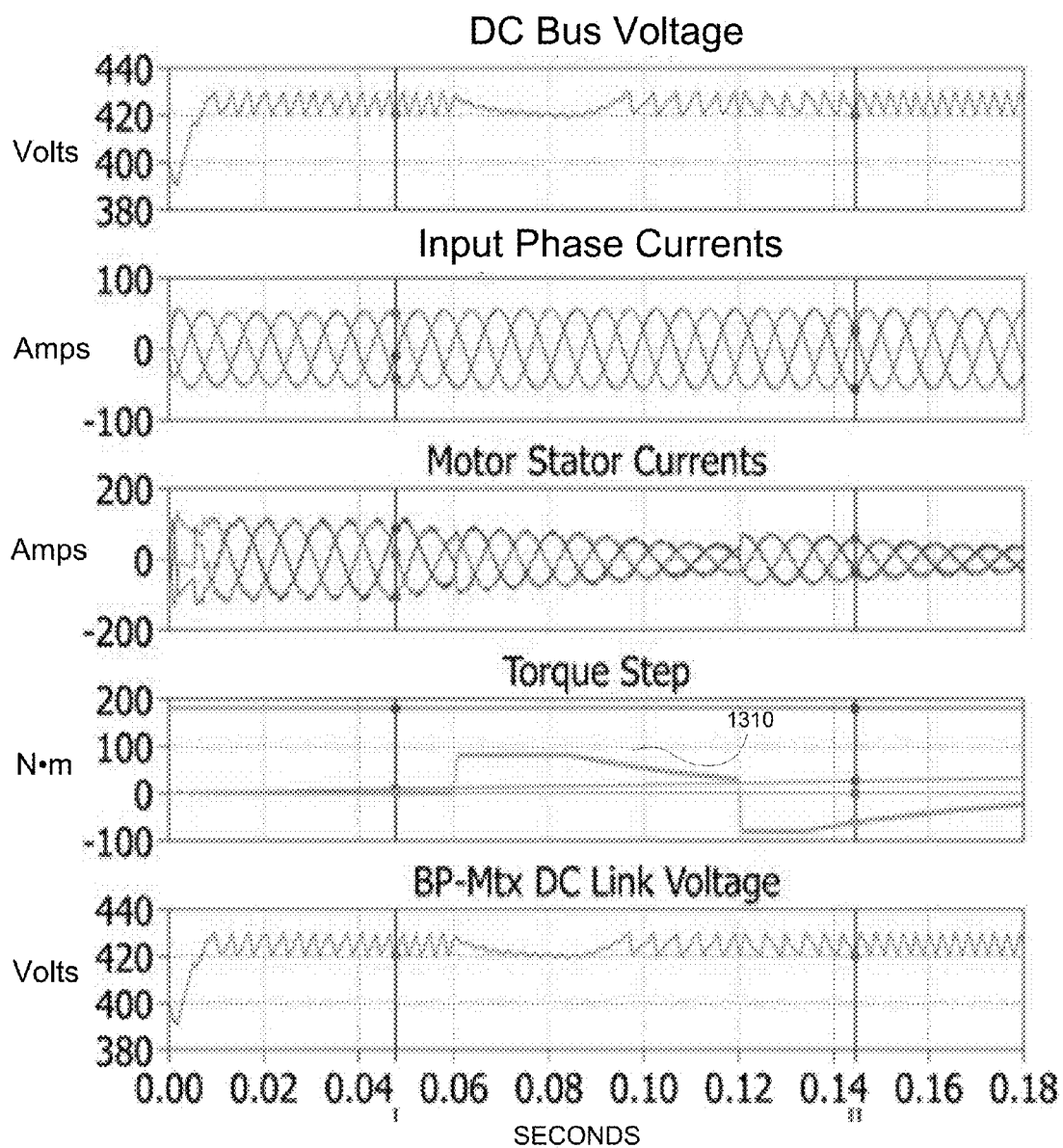
FIG. 13 is a plot of a computer simulation of the embodiment of FIG. 5 with a common link between rectifier systems.

FIG. 13 is a plot 1300 of a computer simulation of the embodiment of FIG. 5 whereby there is a common link between rectifier inverter module 590 and rectifier matrix 520. That is, both rectifier systems are simultaneously connected to the DC-bus 550. However, there is no contribution from the DC power source 560. The DC V voltage and the Bi-Phase Matrix voltages are identical, as should be expected and was calculated to have a minimum of 418V and maximum of 430V through the 100 N·m torque change 1310 at the motor shaft. The RMS voltage was calculated as 424V. It is believed that the current limiters are clamping the voltage swing with a small delta voltage. The Input Phase Currents plot is significantly more symmetrical than those seen in FIG. 12.

Figure 14:
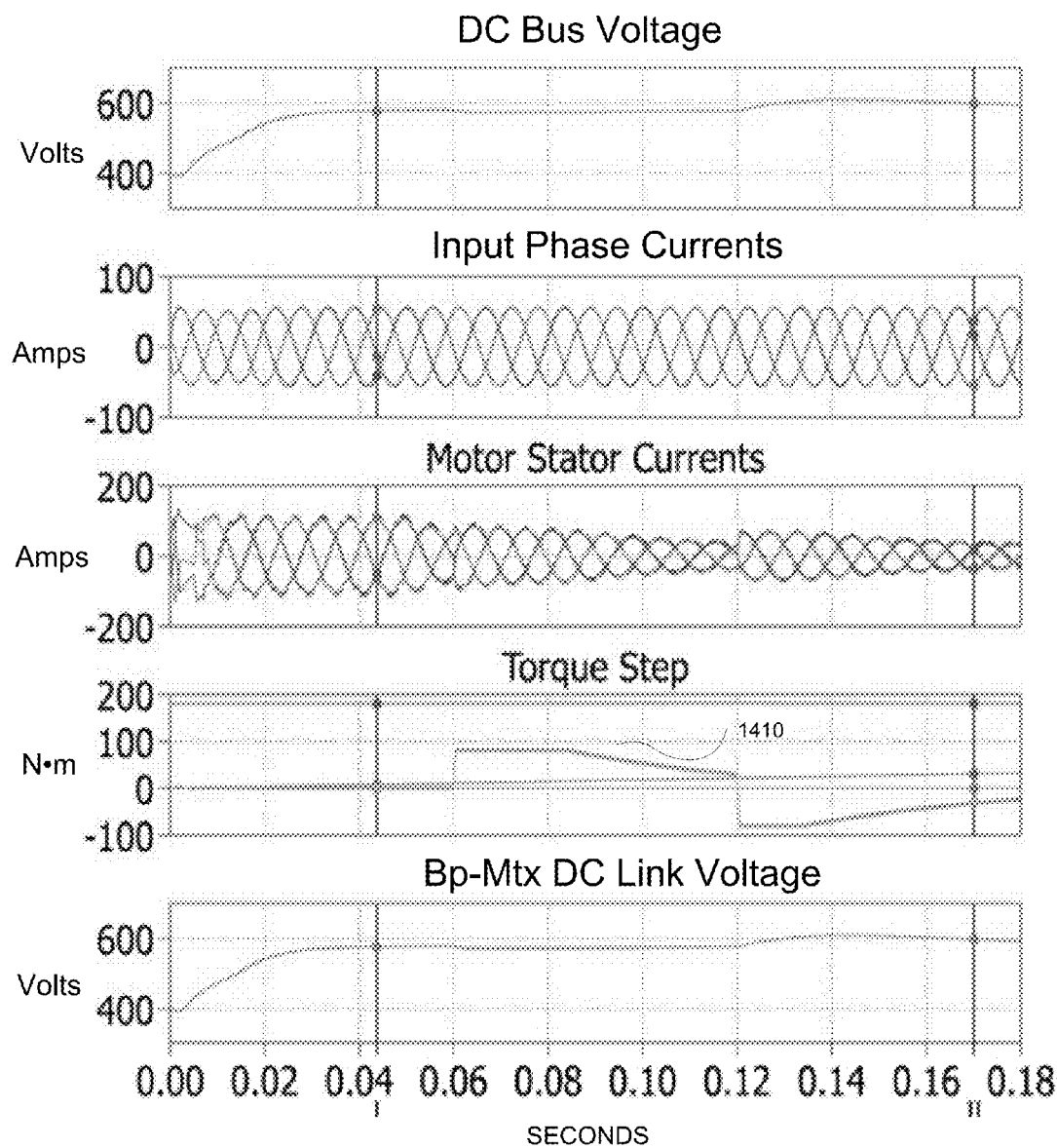
FIG. 14 is a plot of a computer simulation of the embodiment of FIG. 5 with a common link between rectifier systems and boosting.

FIG. 14 is a plot 1400 of a computer simulation of the embodiment of FIG. 5 with a common link between rectifier inverter module 590 and rectifier matrix 520, and also contribution from the DC power supply 560, including the DC-boost circuit 563. As expected, the DC V voltage and the Bi-Phase Matrix voltages are identical, however, they show a boosted minimum of 570V and boosted maximum of 609V through the 100 N·m torque change 1410 at the motor shaft. The RMS voltage was calculated as 579V. The addition of the DC power supply 560 with DC-boost circuit 563 can be seen to provide a significant improvement.

The contribution from the boost circuit 563 (e.g., output of DC power supply 560) can be controlled to adjust the amount of DC voltage contribution to the DC-bus 550. The ability to adjust the DC-bus 550 voltage allows loads such as electric motors to operate at an optimal efficiency without concern for input source matching capability. The flexibility of the boost circuit 563 can be seen by having one boost circuit 563 serving the needs of either a single motor, or a dual system with two output loads. Additionally, the independence of the bi-phase matrix 510 allows for opportunities to boost additional regenerative energy back to the bi-directional rectifier inverter module 590, for additional power recovery.

Figure 15A:
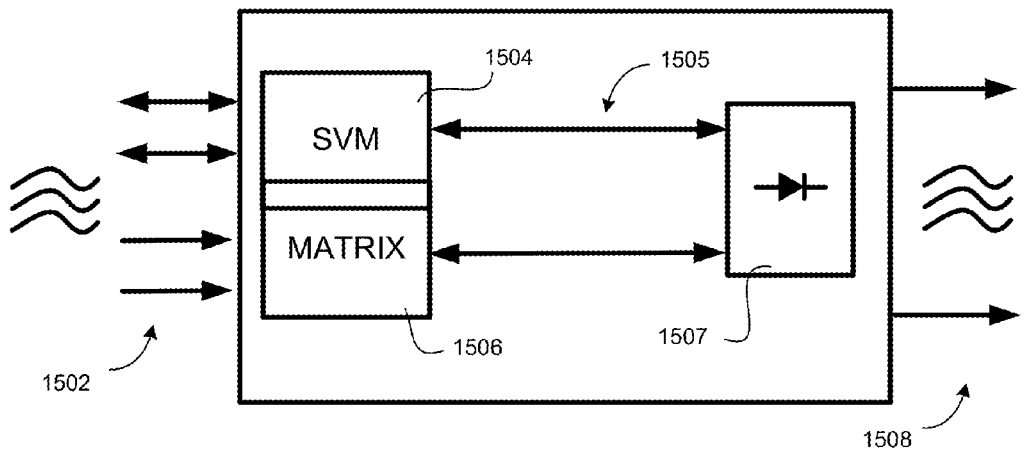
FIG. 15A is a simplified block diagram approach for illustrating top level connections for a modified inverter system with a single input, single output.

FIG. 15A is a simplified block diagram approach for illustrating top level connections for a modified inverter system 1500 with a single input, single output. A single AC line input source 1502 feeds the modified inverter system 1500 and the system outputs "controlled" AC three phase power 1508, for use by a load (not shown). The bi-directional arrows of the single AC line input source 1502 convey the fact that bi-directional flow of power can occur (i.e., regeneration of power "into" the AC line input source 1502 from the modified inverter system 1500). The modified inverter system 1500 comprises the input rectifier/inverter 1504 (labeled in these and the following FIGS. as SVM to simply distinguish from the bi-phase matrix) and bi-phase matrix 1506, as described in the above embodiments. Input rectifier/inverter 1504 is shown as "overlapping" bi-phase matrix 1506 to signify that they jointly form a single inverter architecture that supplies DC power to DC bus link 1505.

The output of DC bus link 1505 is coupled to a single DC-AC inverter 1507, which generates a single controlled AC three power 1508. This block diagram serves as "shorthand" for the top level connections found in the embodiment of FIG. 3.

Figure 15B:
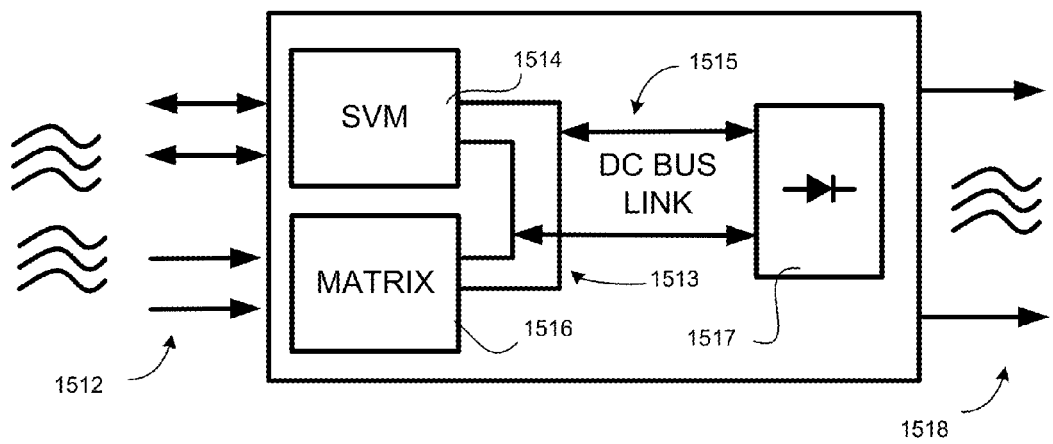
FIG. 15B is a simplified block diagram approach for illustrating top level connections for a modified inverter system with dual input, bridging and single output.

FIG. 15B is a simplified block diagram approach for illustrating top level connections for another modified inverter system 1510 with dual input, bridging and single output. Two AC line input sources 1512 (for example, AC line power and AC generator power) fed the modified inverter system 1510 and the system outputs "controlled" AC three phase power 1518, for use by a load (not shown). The bi-directional arrows of the dual AC line input sources 1512 convey the fact that bi-directional flow of power can occur. The modified inverter system 1510 comprises the (SVM) input rectifier/inverter 1514 and bi-phase matrix 1516, as described in the above embodiments. SVM inverter 1514 does not overlap with bi-phase matrix 1516, but is shown as being separate. However, mutual connection to DC-bus link 1515 is facilitated by connecting bridge(s) 1513. Power from the DC-bus link 1515 is converted to AC via single DC-AC inverter 1517 to AC three phase power for subsequent powering of a load (not shown).

Figure 15C:
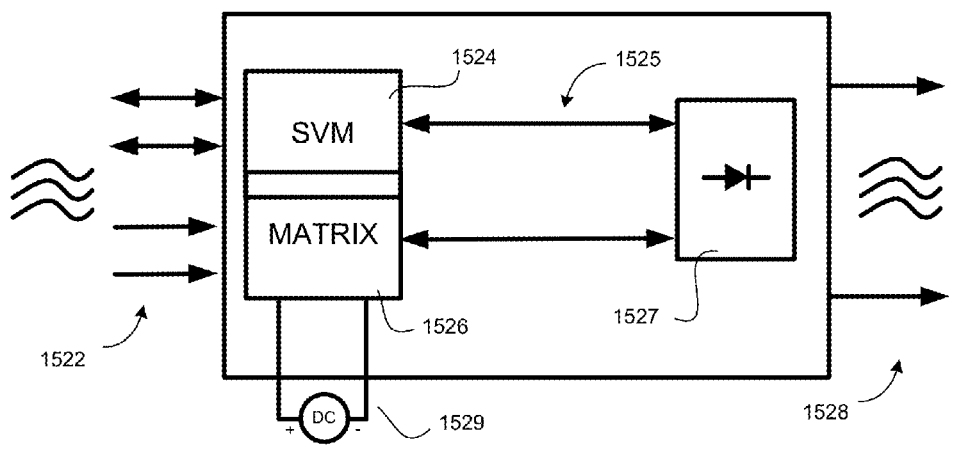
FIG. 15C is a simplified block diagram approach for illustrating top level connections for a modified inverter system with a single input, a DC power supply, and single output.

FIG. 15C is a simplified block diagram approach for illustrating top level connections for a modified inverter system 1520 with a single input, a DC power supply, and single output. The modified inverter system 1520 is fed by a single AC line input source 1522 to output a single AC three phase load power 1528. The bi-directional arrows of the single AC line input source 1522 convey the fact that bi-directional flow of power can occur. The modified inverter system 1520 comprises (SVM) input rectifier/inverter 1524 and bi-phase matrix 1526, as described in the above embodiments. SVM rectifier/inverter 1524 is shown as "overlapping" bi-phase matrix 1526 to signify that they jointly form a single inverter architecture that supplies DC power to DC bus link 1505. Additionally, DC power source 1529 (with or without boosting) is coupled to the bi-phase matrix 1526 as an extra energy port, as detailed in the above embodiments. The "co-joined" inverter architecture provides a DC output which is channeled by DC bus link 1525 a single DC-AC inverter 1527, which outputs a single AC three phase power 1528 to a load (not shown). This block diagram serves as "shorthand" for the top level connections found in the embodiment of FIG. 4.

Figure 15D:
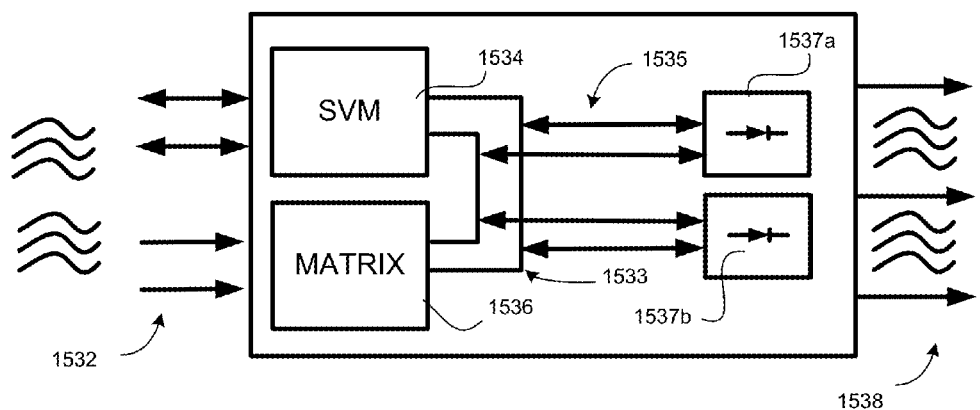
FIG. 15D is a simplified block diagram approach for illustrating top level connections for a modified inverter system with dual input, bridging and dual outputs.

FIG. 15D is a simplified block diagram approach for illustrating top level connections for a modified inverter system 1530 with dual input, bridging and dual outputs. Two AC line input sources 1532 (for example, AC line power and AC generator power) fed the modified inverter system 1530 and the system outputs two "controlled" AC three phase power 1538, for use by a load(s) (not shown). The bi-directional arrows of the dual AC line input sources 1532 convey the fact that bi-directional flow of power can occur. The modified inverter system 1530 comprises an (SVM) input rectifier/inverter 1534 and bi-phase matrix 1536, as described in the above embodiments. SVM inverter 1534 does not overlap with bi-phase matrix 1536, but is shown as being separate. However, connection to two DC-bus links 1515 is facilitated by connecting bridge(s) 1513. Each DC-bus link 1515 is coupled to a separate DC-AC inverter (1537a, 1537b), which converts the supplied DC power to AC three phase power 1538. Since the DC-AC inverters (1537a, 1537b) are separate, the output of the modified inverter system 1530 can also be separate, providing power for two loads, if so desired. Of course, switching of paths (to different DC-AC inverters) may be implemented according to design preference.

Figure 15E:
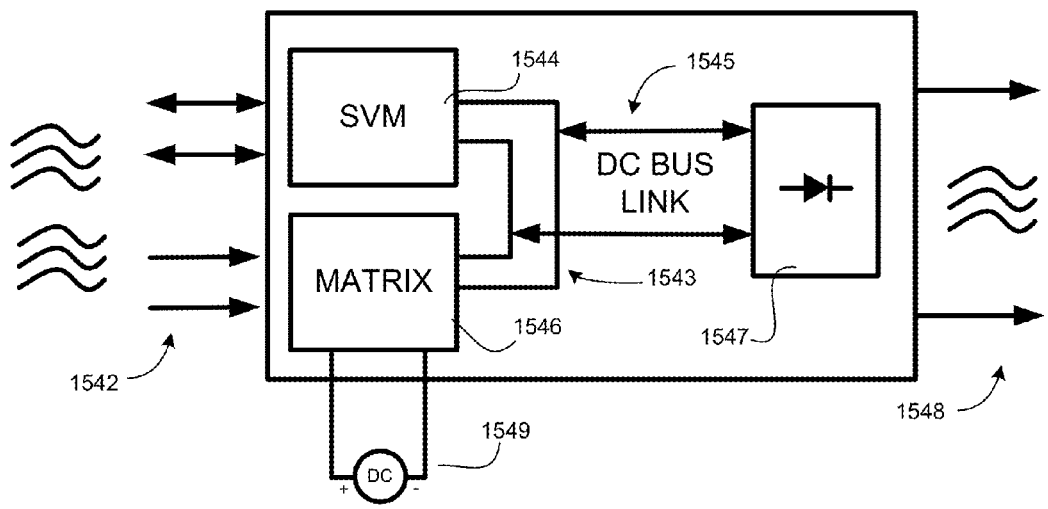
FIG. 15E is a simplified block diagram approach for illustrating top level connections for a modified inverter system with dual input, bridging, DC power supply and single output.

FIG. 15E is a simplified block diagram approach for illustrating top level connections for a modified inverter system 1540 with dual input, bridging, DC power supply and single output. Two AC line input sources 1542 (for example, AC line power and AC generator power) fed the modified inverter system 1540 and the system outputs "controlled" AC three phase power 1548, for use by a load(s) (not shown). The bi-directional arrows of the dual AC line input sources 1542 convey the fact that bi-directional flow of power can occur. The modified inverter system 1540 comprises an (SVM) input rectifier/inverter 1544 and bi-phase matrix 1546, as described in the above embodiments. Additionally, DC power source 1549 (with or without boosting) is coupled to the bi-phase matrix 1546 as an extra energy port, as detailed in the above embodiments. SVM inverter 1544 does not overlap with bi-phase matrix 1546, but is shown as being separate. Connection to a DC-bus link 1545 is facilitated by connecting bridge 1543. DC power from the DC-bus link 1545 is converted to AC via a single DC-AC inverter 1547, which outputs a single AC three phase power 1528 to a load (not shown). This block diagram serves as "shorthand" for the top level connections found in the embodiment of FIG. 5.

Figure 15F:
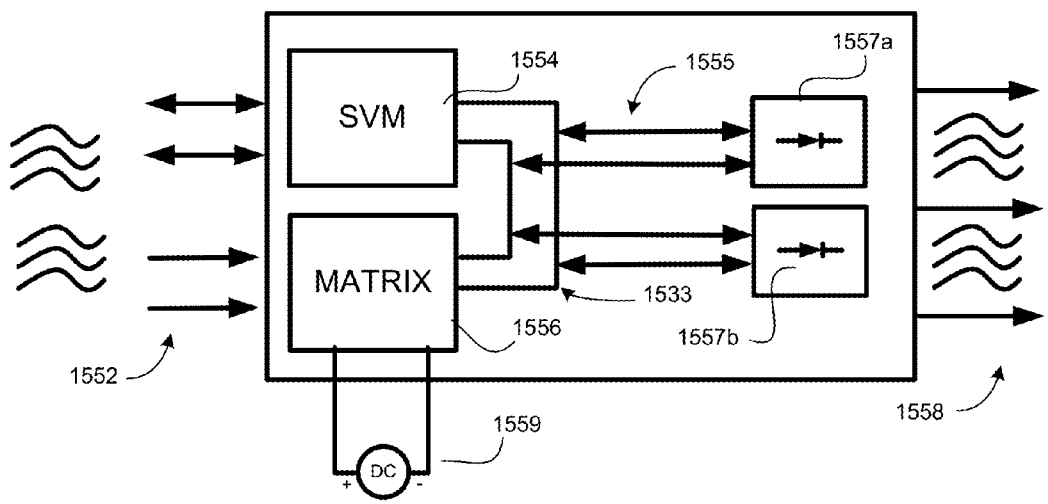
FIG. 15F is a simplified block diagram approach for illustrating top level connections for a modified inverter system with dual input, bridging, DC power supply, and dual outputs.

FIG. 15F is a simplified block diagram approach for illustrating top level connections for a modified inverter system 1550 with dual input, bridging, DC power supply, and dual outputs. Two AC line input sources 1552 (for example, AC line power and AC generator power) fed the modified inverter system 1550 and the system outputs two "controlled" AC three phase power 1558, for use by a load(s) (not shown). The bi-directional arrows of the dual AC line input sources 1552 convey the fact that bi-directional flow of power can occur. The modified inverter system 1550 comprises an (SVM) input rectifier/inverter 1554 and bi-phase matrix 1556, as described in the above embodiments. Additionally, DC power source 1559 (with or without boosting) is coupled to the bi-phase matrix 1556 as an extra energy port, as detailed in the above embodiments. SVM inverter 1554 does not overlap with bi-phase matrix 1556, but is shown as being separate. However, connection to two DC-bus links 1555 is facilitated by connecting bridge(s) 1553. Each DC-bus link 1555 is coupled to a separate DC-AC inverter (1557a, 1557b), which converts the supplied DC power to AC three phase power 1558. Since the DC-AC inverters (1557a, 1557b) are separate, the output of the modified inverter system 1550 can also be separate, providing power for two loads, if so desired. Of course, switching of paths (to different DC-AC inverters) may be implemented according to design preference.

It is apparent that given the various iterations and numerous combinations shown in the above embodiments, additional modifications and changes within the purview of one ordinary skill in the art may be made without departing from the spirit and scope of this disclosure.

It was noted above that a system controller may be integrated into the overall system or separate, being a computer or processing device which may be under automatic software operation. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) that is stored in a non-transitory form in a tangible computerreadable memory device such as semiconductor memory, magnetically stored memory, optically stored memory, and other now or future devised memory devices to support computing operations. For example, a software application using volatile or non-volatile memory in a hardware machine could be utilized to achieve the desired functions. Also, hardware objects could communicate using electrical signals, with states of the signals representing different data which are interpreted by the software components for appropriate controlling of switches, etc.

These hardware-software combinations can form specially-programmed devices which may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Further, although process steps, logic, flow, algorithms or the like are typically represented as software instructions described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A multi-mode, regenerative AC-DC-AC inverter power system, comprising:
    a first inverter bridge with controllable switches configurable for coupling to line inputs from a 3-phase AC power source;
    a bi-phase matrix (BP-Mtx) containing an upper pair of reverse current oriented, series-connected first set of controllable BP-Mtx switches, a lower pair of reverse current oriented, series-connected second set of controllable BP-Mtx switches, wherein inputs to the first and second sets of controllable BP-Mtx switches are coupled to inputs of the first inverter bridge, and outputs of the first and second sets of the controllable BP-Mtx switches are coupled to inputs to a third set of reverse current oriented, series-connected controllable BP-Mtx switches bridging the first and second sets of BP-Mtx switches, wherein outputs of the first, second and third BP-Mtx switches are from junctions of each BP-Mtx switch pair;
    a chargeable DC power supply coupled to a center point of the third set of controllable BP-Mtx switches;
    a DC-bus coupled to outputs of the first inverter bridge; and
    a second inverter bridge with controllable switches, inputs thereof coupled to an opposite end of the DC-bus from the first inverter bridge, and outputs thereof configurable for coupling to a load,
    wherein switches of at least the first inverter bridge, second inverter bridge, and BP-Mtx are controllable to charge the DC power supply from at least one of excess voltage from the line inputs and DC-bus, and to provide compensating energy from the DC power supply for load or line input perturbations.

2. The system of claim 1, wherein the DC bus is shunted by at least a DC voltage stabilizing capacitor.

3. The system of claim 1, wherein the DC power supply comprises at least one of a battery, an ultracapacitor, and disconnect switch.

4. The system of claim 1, further comprising a switch controller, controlling switches of at least the first inverter bridge, second inverter bridge, and BP-Mtx.

5. The system of claim 4, wherein the switch controller utilizes a State Vector Method (SVM) for switch modulation.

6. The system of claim 1, wherein switches of at least the first inverter bridge, second inverter bridge, and BP-Mtx are at least one of diode bridged, field-effect transistors (FETs), power metal-oxide-semiconductor-effect transistors (MOSFETs), and insulated-gate-bipolar Transistors (IGBT).

7. The system of claim 1, wherein the first inverter bridge and second inverter bridge are of a similar arrangement of six diode-bridged transistors in forward current oriented pairs connected in parallel, and the BP-Mtx switches are six diode-bridged transistors.

8. The system of claim 1, further comprising:
   line inputs from a 3-phase AC power source coupled to the first inverter bridge; and
   a load coupled to the second inverter bridge.

9. The system of claim 1, further comprising a DC boost circuit coupled to the DC power supply.

10. A multi-mode, regenerative AC-DC-AC inverter power system, comprising:
    a rectifying bridge configurable for coupling to line inputs from a first 3-phase AC power source;
    a bi-phase matrix (BP-Mtx) comprising, an upper pair of reverse current oriented, series-connected first set of controllable BP-Mtx switches, a lower pair of reverse current oriented, series-connected second set of controllable BP-Mtx switches, wherein inputs to the first and second sets of controllable BP-Mtx switches are coupled to inputs of the rectifying bridge, and outputs of the first and second set of controllable BP-Mtx switches are coupled to inputs to a third set of reverse current oriented, series-connected controllable BP-Mtx switches bridging the first and second set of BP-Mtx switches, wherein outputs of the first, second and third BP-Mtx switches are from junctions of each BP-Mtx switch pair;
    a chargeable DC power supply coupled to a center point of the third set of controllable BP-Mtx switches;
    a bridge connection coupled to outputs of the rectifying bridge and to a DC-bus configurable for coupling to a load; and
    an inverter bridge with controllable switches, configurable for coupling to line inputs from a second 3-phase AC power source, wherein an output of the inverter bridge is coupled to at least one of the bridge connection and the DC-bus,
    wherein switches of at least the BP-Mtx and inverter bridge are controllable to charge the DC power supply from at least one of excess voltage from the line inputs and DC-bus, and to provide compensating energy from the DC power supply for load or line input perturbations.

11. The system of claim 10, wherein the DC-bus is shunted by at least a DC voltage stabilizing capacitor.

12. The system of claim 10, wherein the DC power supply comprises at least one of a battery, an ultracapacitor, and disconnect switch.

13. The system of claim 10, further comprising a switch controller, controlling switches of at least the BP-Mtx and inverter bridge.

14. The system of claim 13, wherein the switch controller utilizes a State Vector Method (SVM) for switch modulation.

15. The system of claim 10, further comprising a DC boost circuit coupled to the DC power supply.

16. The system of claim 10, wherein switches of at least the BP-Mtx and inverter bridge are at least one of diode bridged, field-effect transistors (FETs), power metal-oxide-semiconductor-effect transistors (MOSFETs), and insulated-gate-bipolar Transistors (IGBT).

17. The system of claim 10, wherein the BP-Mtx switches are six diode-bridged transistors.

\* \* \* \* \*